United States Patent
Okada et al.

(10) Patent No.: US 11,917,236 B2
(45) Date of Patent: Feb. 27, 2024

(54) INFORMATION PROCESSING APPARATUS, INFORMATION PROCESSING METHOD, AND NON-TRANSITORY COMPUTER-READABLE MEDIA THAT ADD ADDITIONAL INFORMATION TO BASEBAND PACKET

(71) Applicant: Sony Semiconductor Solutions Corporation, Kanagawa (JP)

(72) Inventors: Satoshi Okada, Tokyo (JP); Yutaka Nakada, Kanagawa (JP); Tomoya Kojima, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/785,727

(22) PCT Filed: Jan. 18, 2021

(86) PCT No.: PCT/JP2021/001412
§ 371 (c)(1),
(2) Date: Jun. 15, 2022

(87) PCT Pub. No.: WO2021/153297
PCT Pub. Date: Aug. 5, 2021

(65) Prior Publication Data
US 2023/0051819 A1    Feb. 16, 2023

(30) Foreign Application Priority Data
Jan. 28, 2020   (JP) ................. 2020-011379

(51) Int. Cl.
*H04N 7/173*     (2011.01)
*H04N 21/435*    (2011.01)
*H04N 21/438*    (2011.01)

(52) U.S. Cl.
CPC ....... *H04N 21/435* (2013.01); *H04N 21/4382* (2013.01)

(58) Field of Classification Search
CPC ............. H04N 21/435; H04N 21/4382; H04N 21/4385; H04N 21/6118; H04H 20/28; H04H 20/95
See application file for complete search history.

(56) References Cited

U.S. PATENT DOCUMENTS

2015/0023249 A1*  1/2015  Hwang ................... H04L 69/22
                                                   370/328
2018/0359520 A1* 12/2018  Takahashi .......... H04N 21/4425
(Continued)

FOREIGN PATENT DOCUMENTS

JP        2015-156636 A    8/2015
JP        2016208161 A    12/2016
(Continued)

OTHER PUBLICATIONS

International Search Report (PCT/ISA/210), International Application No. PCT/JP2021/001412, dated Apr. 6, 2021.

*Primary Examiner* — Gigi L Dubasky
(74) *Attorney, Agent, or Firm* — Michael Best & Friedrich LLP

(57) ABSTRACT

Information processing with flexibility in interpretation of a standard is disclosed. In one example, an output unit adds additional information related to the BB packet to output the BB packet to a baseband (BB) packet after an error correction decoding process. The additional information includes at least one of a delimiter, a precision time protocol (PTP), or BB packet information. The BB packet information includes at least one of information indicating whether or not reception of the BB packet is stable, information indicating whether or not there is an error in the BB packet, a (Continued)

packet length of the BB packet, a relative physical layer pipe (PLP) ID of the BB packet, or an absolute PLPID of the BB packet.

20 Claims, 17 Drawing Sheets

(56) References Cited

U.S. PATENT DOCUMENTS

| | | | |
|---|---|---|---|
| 2019/0037055 A1* | 1/2019 | Michael | H04L 65/70 |
| 2020/0136877 A1* | 4/2020 | Kim | H04L 27/2649 |
| 2020/0336572 A1* | 10/2020 | Kwon | H04N 21/2381 |

FOREIGN PATENT DOCUMENTS

| | | |
|---|---|---|
| WO | 2015/198545 A1 | 12/2015 |
| WO | 2017/122544 A1 | 7/2017 |

* cited by examiner

FIG. 9

| ODATA[7:0] | |
|---|---|
| 1 byte | {DELIMITER1[7:0]} |
| 2 byte | {DELIMITER2[7:0]} |
| 3 byte | {DELIMITER3[7:0]} |
| 4 byte | {DELIMITER4[7:0]} |
| 5 byte | {PTP_TI_FLAG[1:0], PTP_TI_SEC[31:26]} |
| 6 byte | {PTP_TI_SEC[25:18]} |
| 7 byte | {PTP_TI_SEC[17:10]} |
| 8 byte | {PTP_TI_SEC[9:2]} |
| 9 byte | {PTP_TI_SEC[1:0], PTP_TI_NSEC[9:4]} |
| 10 byte | {PTP_TI_NSEC[3:0], PTP_TI_USEC[9:6]} |
| 11 byte | {PTP_TI_USEC[5:0], PTP_TI_NSEC[9:8]} |
| 12 byte | {PTP_TI_NSEC[7:0]} |
| 13 byte | {4'b0000, BBPLOCK[3:0]} |
| 14 byte | {BCHERR, FECTYPE[2:0], COD[3:0]} |
| 15 byte | {PLPID_SEL[1:0], PLPID[5:0]} |
| 16 byte | {BBDT[7:0][0]} |
| ... | ... |
| N byte | BBDT[7:0][M-1] |

- DELIMITER PART — OSYNC=H timing
- PTP INFORMATION PART
- BB PACKET INFORMATION PART — Start of BBP
- BB PACKET — M=BBP Length

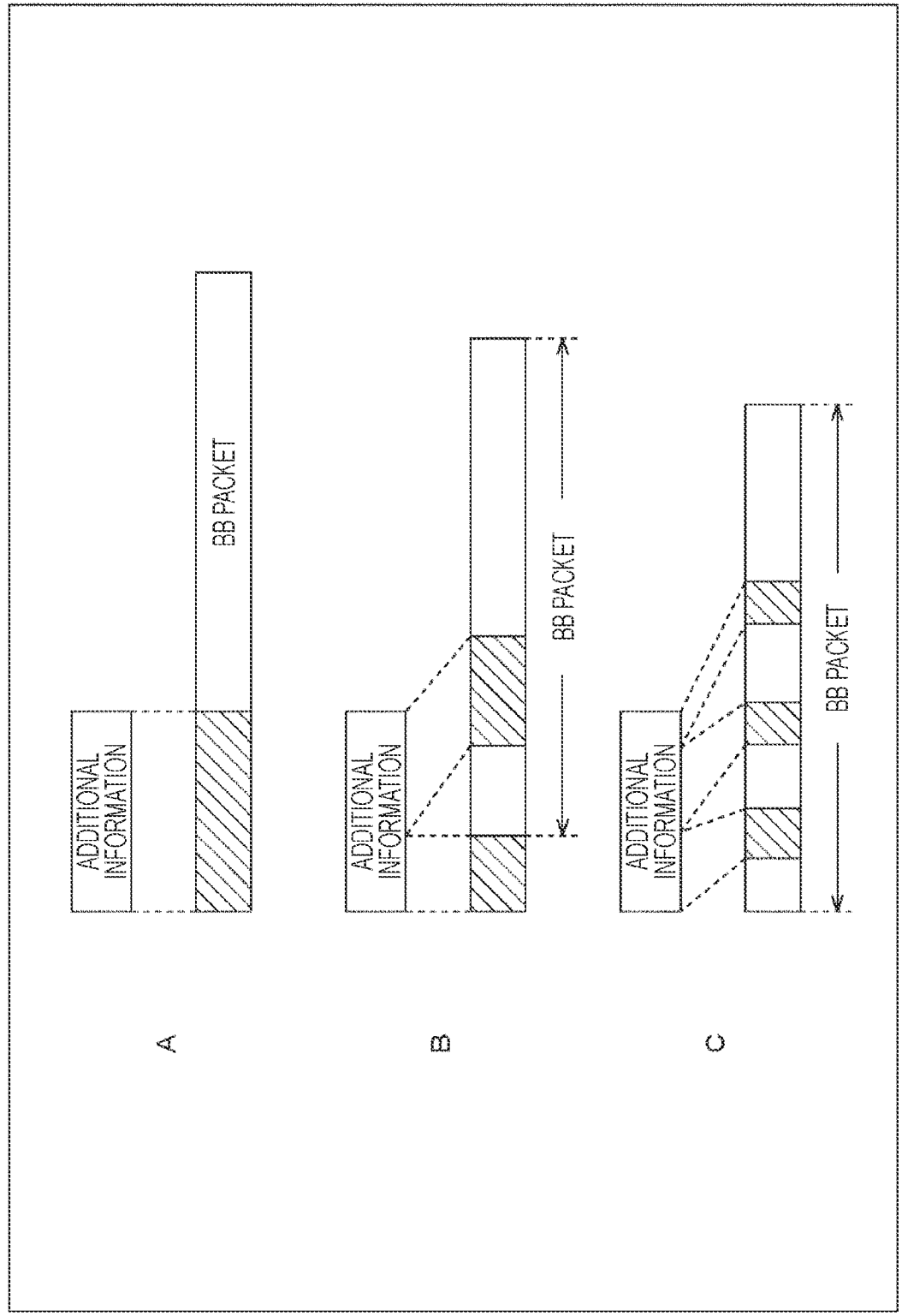

*FIG. 12*

| Signaling Format for L1D_plp_fec_type | |
|---|---|
| Value | Forward Error Correction Method |
| 0000 | BCH+16K LDPC |
| 0001 | BCH+64K LDPC |
| 0010 | CRC+16K LDPC |
| 0011 | CRC+64K LDPC |
| 0100 | 16K LDPC only |
| 0101 | 64K LDPC only |
| 0110~1111 | Reserved for future use |

FIG. 13

Length of $K_{payload}$ (bits) for $N_{inner}$ = 64800

| Code Rate | $K_{payload}$ (BCH) | $M_{outer}$ (BCH) | $K_{payload}$ (CRC) | $M_{outer}$ (CRC) | $K_{payload}$ (no outer) | $M_{outer}$ (no outer) | $M_{inner}$ | $N_{outer}$ |
|---|---|---|---|---|---|---|---|---|
| 2/15 | 8448 | 192 | 8608 | 32 | 8640 | 0 | 56160 | 8640 |
| 3/15 | 12768 | 192 | 12928 | 32 | 12960 | 0 | 51840 | 12960 |
| 4/15 | 17088 | 192 | 17248 | 32 | 17280 | 0 | 47520 | 17280 |
| 5/15 | 21408 | 192 | 21568 | 32 | 21600 | 0 | 43200 | 21600 |
| 6/15 | 25728 | 192 | 25888 | 32 | 25920 | 0 | 38880 | 25920 |
| 7/15 | 30048 | 192 | 30208 | 32 | 30240 | 0 | 34560 | 30240 |
| 8/15 | 34368 | 192 | 34528 | 32 | 34560 | 0 | 30240 | 34560 |
| 9/15 | 38688 | 192 | 38848 | 32 | 38880 | 0 | 25920 | 38880 |
| 10/15 | 43008 | 192 | 43168 | 32 | 43200 | 0 | 21600 | 43200 |
| 11/15 | 47328 | 192 | 47488 | 32 | 47520 | 0 | 17280 | 47520 |
| 12/15 | 51648 | 192 | 51808 | 32 | 51840 | 0 | 12960 | 51840 |
| 13/15 | 55968 | 192 | 56128 | 32 | 56160 | 0 | 8640 | 56160 |

Length of $K_{payload}$ (bits) for $N_{inner}$ = 16200

| Code Rate | $K_{payload}$ (BCH) | $M_{outer}$ (BCH) | $K_{payload}$ (CRC) | $M_{outer}$ (CRC) | $K_{payload}$ (no outer) | $M_{outer}$ (no outer) | $M_{inner}$ | $N_{outer}$ |
|---|---|---|---|---|---|---|---|---|
| 2/15 | 1992 | 168 | 2128 | 32 | 2160 | 0 | 14040 | 2160 |
| 3/15 | 3072 | 168 | 3208 | 32 | 3240 | 0 | 12960 | 3240 |
| 4/15 | 4152 | 168 | 4288 | 32 | 4320 | 0 | 11880 | 4320 |
| 5/15 | 5232 | 168 | 5368 | 32 | 5400 | 0 | 10800 | 5400 |
| 6/15 | 6312 | 168 | 6448 | 32 | 6480 | 0 | 9720 | 6480 |
| 7/15 | 7392 | 168 | 7528 | 32 | 7560 | 0 | 8640 | 7560 |
| 8/15 | 8472 | 168 | 8608 | 32 | 8640 | 0 | 7560 | 8640 |
| 9/15 | 9552 | 168 | 9688 | 32 | 9720 | 0 | 6480 | 9720 |
| 10/15 | 10632 | 168 | 10768 | 32 | 10800 | 0 | 5400 | 10800 |
| 11/15 | 11712 | 168 | 11848 | 32 | 11880 | 0 | 4320 | 11880 |
| 12/15 | 12792 | 168 | 12928 | 32 | 12960 | 0 | 3240 | 12960 |
| 13/15 | 13872 | 168 | 14008 | 32 | 14040 | 0 | 2160 | 14040 |

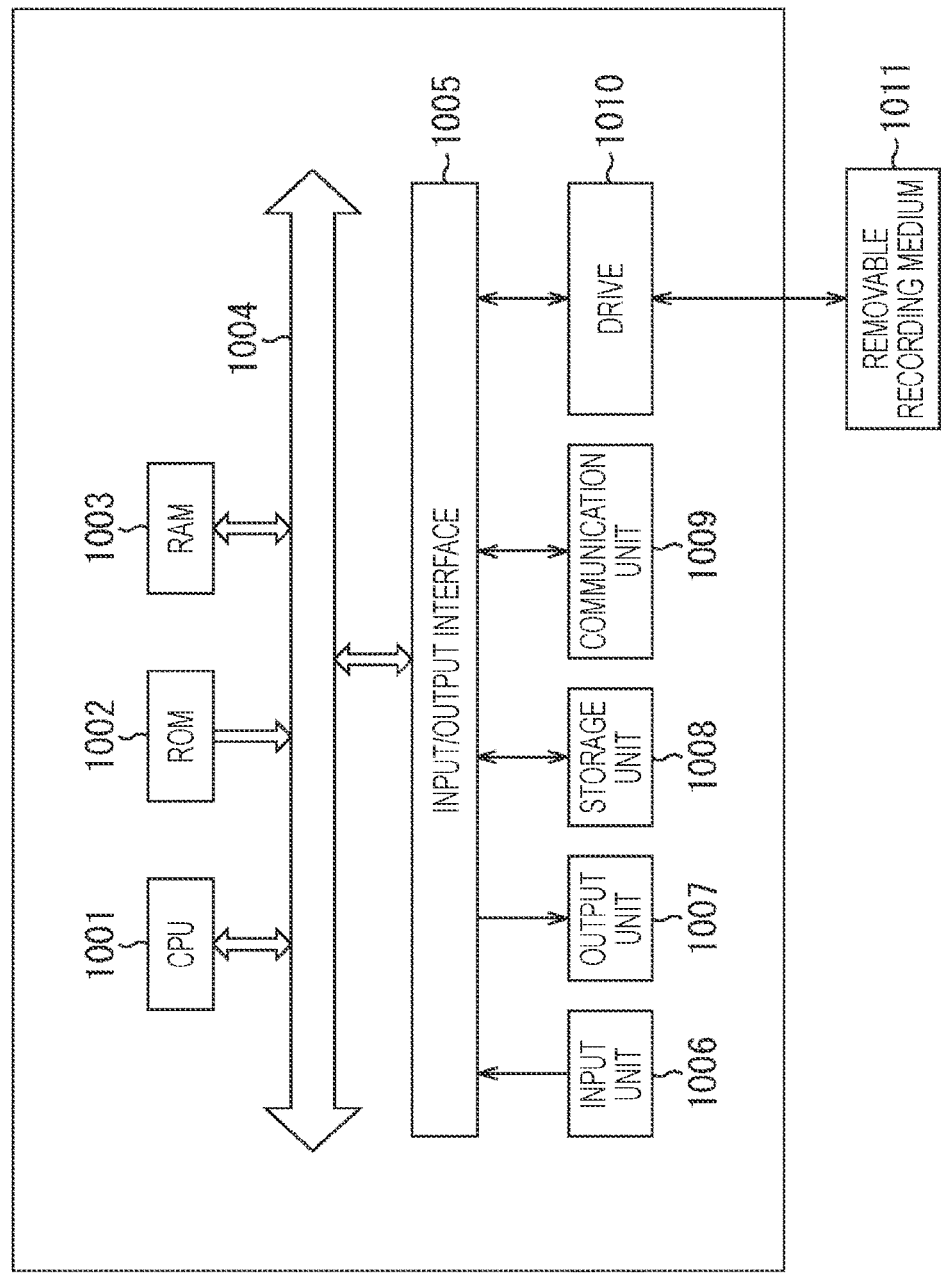

INFORMATION PROCESSING APPARATUS, INFORMATION PROCESSING METHOD, AND NON-TRANSITORY COMPUTER-READABLE MEDIA THAT ADD ADDITIONAL INFORMATION TO BASEBAND PACKET

TECHNICAL FIELD

The present technology relates to an information processing apparatus, an information processing method, and a program, and particularly relates to an information processing apparatus, an information processing method, and a program capable of more flexibly coping with a change in a transmission system.

BACKGROUND ART

At present, an MPEG2 transport stream (TS) system is widely used as a transmission system of digital broadcasting, but in the future, an IP transmission system using an Internet protocol (IP) packet used in a communication field for digital broadcasting is assumed to be widely used.

For example, in Advanced Television Systems Committee (ATSC) 3.0 which is one of the next generation terrestrial broadcasting standards, it is expected that a more advanced service can be provided by adopting the IP transmission system (see, for example, Patent Document 1). In addition, it is expected that the IP transmission system will be used in the future also in a broadcasting system other than ATSC 3.0.

CITATION LIST

Patent Document

Patent Document 1: Japanese Patent Application Laid-Open No. 2016-208161

SUMMARY OF THE INVENTION

Problems to be Solved by the Invention

In the operation of digital broadcasting, in a case where the MPEG2-TS system is introduced as an existing transmission system, it is assumed that the IP transmission system is introduced as a new transmission system, and in this case, it is desirable to be able to more flexibly cope with the change of the transmission system.

In a case where a new transmission system is applied, even in a case where there is a difference in operation with the new transmission system, for example, there is a difference in interpretation of the system, it is desired that an event in which processing cannot be performed due to the difference in operation does not occur. Also in this respect, it is desirable to be able to flexibly cope with the change in the transmission system.

The present technology has been made in view of such a situation, and makes it possible to more flexibly cope with a change in a transmission system.

Solution to Problems

An information processing apparatus according to an aspect of the present technology includes an output unit configured to add, to a baseband (BB) packet after an error correction decoding process, additional information related to the BB packet to output the BB packet.

An information processing method according to an aspect of the present technology includes an information processing apparatus adding, to a BB (baseband) packet after an error correction decoding process, additional information related to the BB packet and outputting the BB packet.

A program according to an aspect of the present technology causes a computer to function as a processing unit configured to add, to a BB (baseband) packet after an error correction decoding process, additional information related to the BB packet to output the BB packet.

In the information processing apparatus, the information processing method, and the program according to an aspect of the present technology, additional information related to a BB (baseband) packet is added to the BB packet after an error correction decoding process and is output.

Note that the information processing apparatus may be an independent apparatus or an internal block constituting one apparatus.

BRIEF DESCRIPTION OF DRAWINGS

FIG. 9 is a diagram for explaining additional information.

FIG. 10 is a diagram for describing a position at which additional information is added.

FIG. 12 is a diagram for describing an FEC type.

FIG. 13 is a diagram for explaining a packet length.

FIG. 17 is a diagram illustrating a configuration example of a computer.

MODE FOR CARRYING OUT THE INVENTION

Modes for carrying out the present technology (hereinafter, it is referred to as embodiments) will be described below.

The device according to the present exemplary embodiment as a device capable of processing a received broadcast signal. For example, there is a case where a broadcast signal is transmitted in a form in which a plurality of data packets is included in one transmission packet as in a case where the ATSC 3.0 standard described in Non-Patent Document 1 described below is used. In the case of processing the broadcast signal as described above, the device according to the present embodiment extracts the data packet from the transmission packet obtained by demodulating the broadcast signal, and processes the extracted data packet, for example.

Non-Patent Document 1: "ATSC Candidate Standard: Link-Layer Protocol (A/330)"

Hereinafter, the configuration of the processing device according to the present embodiment and the processing method according to the present embodiment will be described by mainly exemplifying a case where the processing device according to the present embodiment processes a broadcast signal conforming to the ATSC 3.0 standard. Note that the processing method according to the present embodiment described below is not limited to being applied to the ATSC 3.0 standard, and can be applied to any standard capable of transmitting a plurality of data packets with one transmission packet. In addition, the processing method according to the present embodiment described below can be applied to processing of any broadcast signal in which a plurality of data packets can be transmitted in a form of being included in one transmission packet, regardless of the presence or absence of standardization.

<Outline of Present Technology>

In order to facilitate understanding of a demodulation device and the like to which a processing device to which the present technology is applied, a demodulation device and the like with respect to a current digital broadcasting transmission system will be simply described before describing a demodulation circuit and the like to which the present technology is applied.

As described above, the MPEG2-TS system is widely used as a transmission system of digital broadcasting, but the adoption of the IP transmission system is expected. For example, in ATSC 3.0 which is one of the next generation terrestrial broadcasting standards, it is specified that the IP transmission system is used and a UDP/IP packet is stored in an ATSC link-layer protocol (ALP) packet and transmitted.

Figure 1:
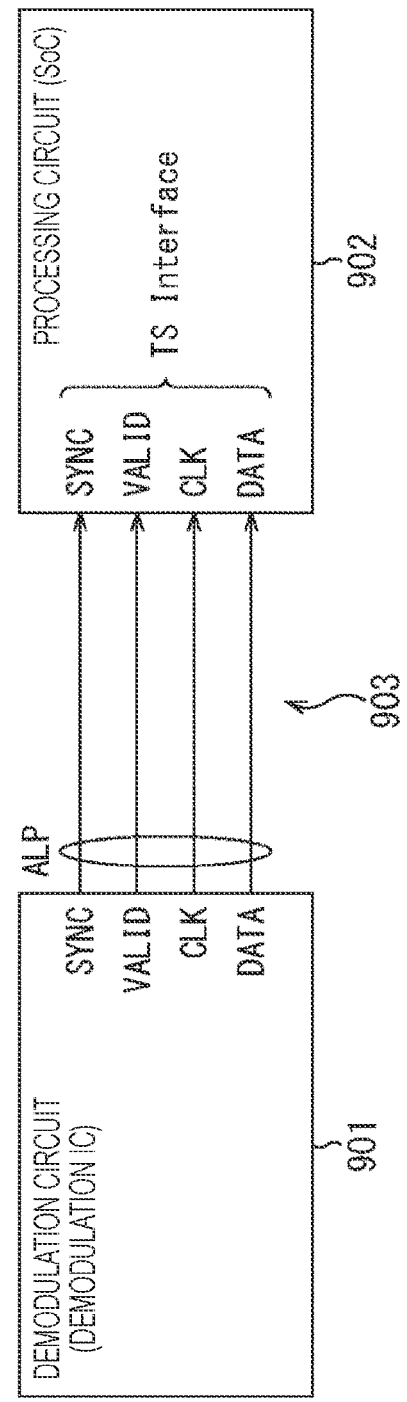
FIG. 1 is a block diagram illustrating a configuration of a demodulation IC and a system on chip (SoC) on a reception side.

In the television receiver, as illustrated in FIG. 1, the broadcast signal is demodulated by the demodulation IC, and a packet obtained as a result thereof is processed by a system on chip (SoC) in a subsequent stage. In FIG. 1, a demodulation circuit 901 is a demodulation IC conforming to ATSC 3.0, and is connected to a processing circuit 902 configured as a system on chip (SoC) via a physical interface 903 of the MPEG2-TS system.

In this case, the physical interface 903 between the demodulation circuit 901 and the processing circuit 902 conforms to the MPEG2-TS system, but the format of the data to be transmitted is an ALP packet conforming to ATSC 3.0. A synchronization signal (SYNC), a valid signal (VALID), a clock signal (CLK), and data (DATA) are transmitted by the ALP packet.

Figure 2:
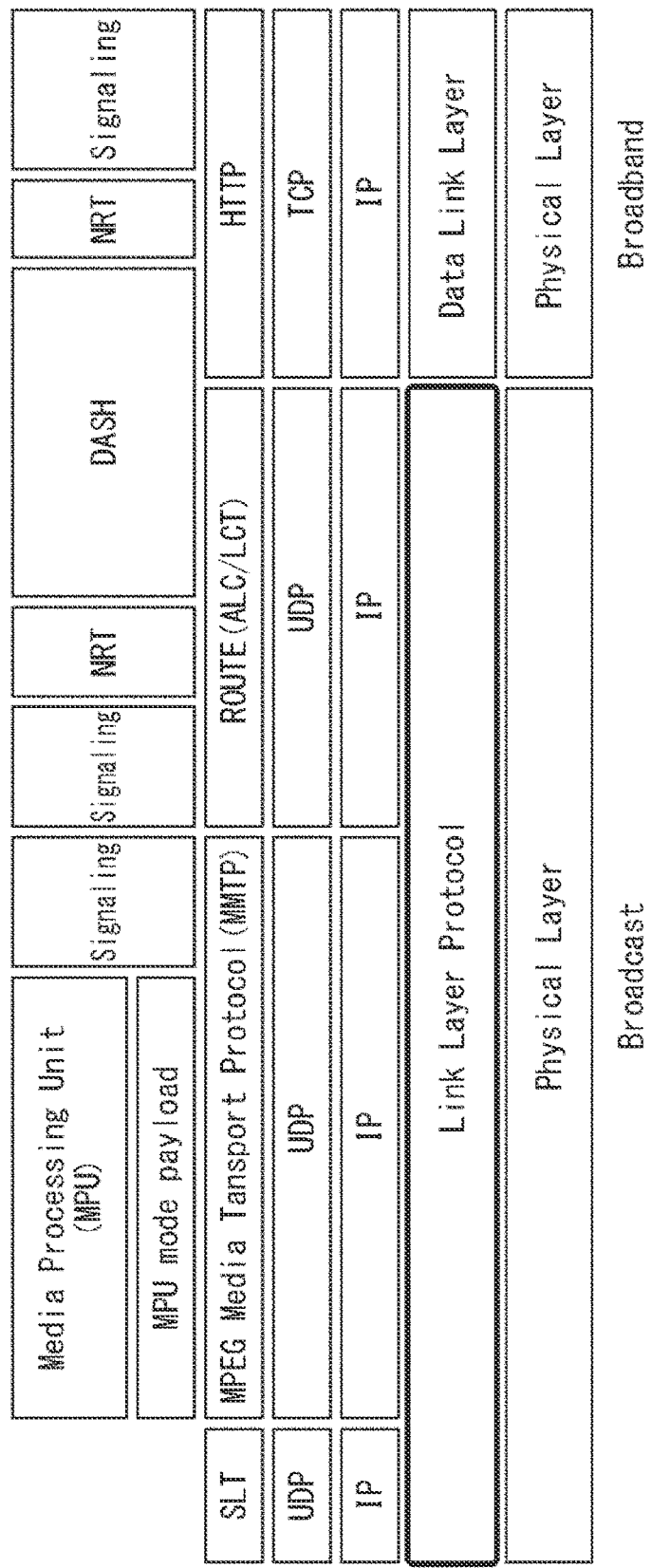
FIG. 2 is a diagram illustrating an example of a protocol stack of an IP transmission system.

FIG. 2 illustrates an example of a protocol stack of the IP transmission system. As illustrated in FIG. 2, in the IP transmission system, by using a common IP protocol in unidirectional broadcasting and bidirectional communication, for example, a stream of a content such as a television program can be transmitted in units of DASH segments, and streaming delivery conforming to MPEG dynamic adaptive streaming over HTTP (DASH) can be performed.

In FIG. 2, a data link layer is an upper layer for a physical layer of broadcast, and a lower layer for a UDP layer and an IP layer, and an ALP packet conforming to a link layer protocol is used in the data link layer.

Figure 3:
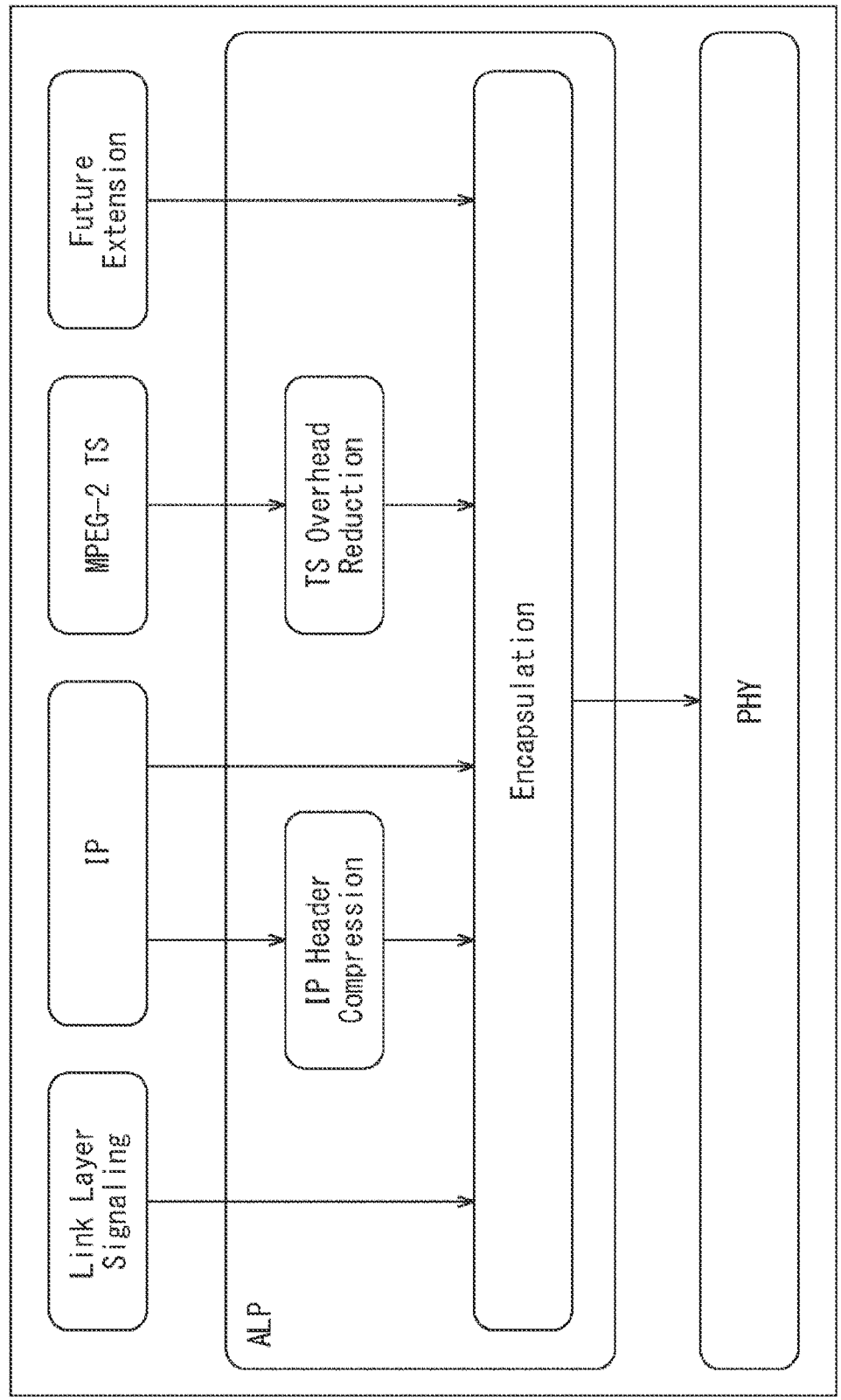
FIG. 3 is a diagram illustrating a system architecture of an ALP packet.

In addition, FIG. 3 illustrates a system architecture of an LP packet. As illustrated in FIG. 3, an ALP packet is generated by encapsulating signaling (Link Layer Signaling), a TS packet used in the MPEG2-TS system, or the like, in addition to an IP packet (UDP/IP packet). However, when an IP packet is encapsulated, an IP header can be compressed. In addition, when encapsulating the TS packet, overhead can be reduced.

Figure 4:
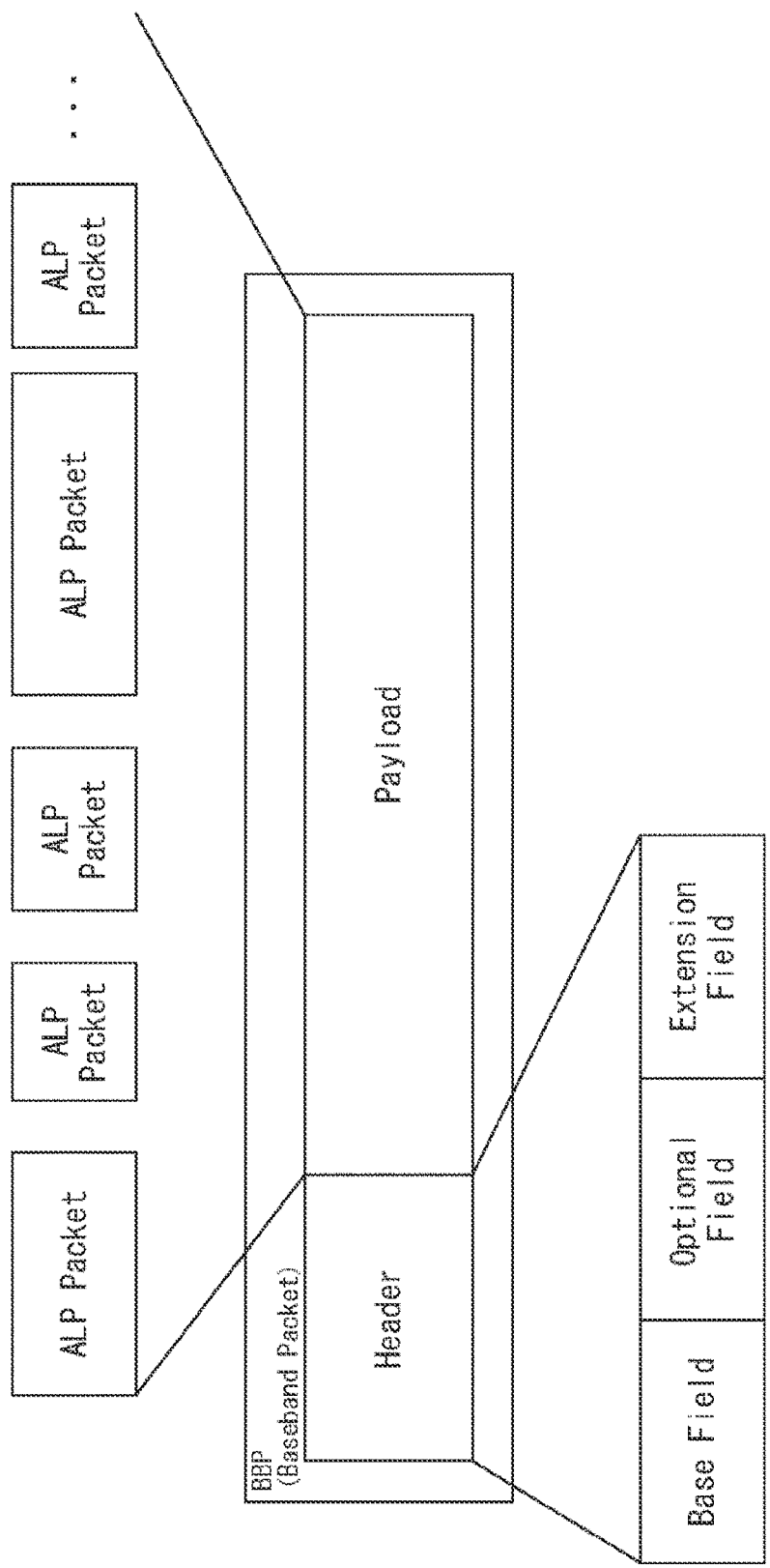
FIG. 4 is a diagram illustrating a structure of a BB packet.

FIG. 4 is a diagram illustrating an example of a transmission packet processed by the demodulation circuit 901. The transmission packet illustrated in FIG. 4 illustrates a configuration of a BB packet (baseband packet) including a plurality of ALP packets defined in the ATSC 3.0 standard.

As illustrated in FIG. 4, the BB packet may have a header part ("Header" illustrated in FIG. 4) and a payload part ("Payload" illustrated in FIG. 4), and a plurality of ALP packets may be included in the payload part. The ALP packet is a variable-length packet that can take different data lengths as represented by a rectangular size in FIG. 4. In addition, respective ALP packets illustrated in FIG. 4 are a first ALP packet, a second ALP packet, . . . in order from the left.

In the demodulation circuit 901 (FIG. 1), the ALP packet is extracted from the BB packet and transmitted to the processing circuit 902 via the physical interface 903. The processing circuit 902 processes the ALP packet.

If the demodulation circuit 901 processes the ALP packet on the basis of erroneous interpretation instead of the interpretation specified in ATSC 3.0, the ALP packet cannot be correctly extracted. In addition, if the processing circuit 902 processes the ALP packet on the basis of erroneous interpretation instead of the interpretation specified in ATSC 3.0, the ALP packet cannot be correctly processed. However, since ATSC 3.0 is complicated, there is a possibility that a difference in interpretation is caused in a broadcasting station, and a broadcast different from one according to the standard is operated.

In addition, by enabling operation with a wider range of interpretation and enabling correct processing by the processing circuit 902 even if the broadcasting station operates with its own interpretation, for example, the operation of ATSC 3.0 can be made flexible.

For example, when the transmission system is switched from the existing system to the new system, there is a demand for a proposal to be able to more flexibly cope with the change in the transmission system or to be able to flexibly cope with the interpretation related to the operation. By applying the present technology described below, it is possible to more flexibly cope with a change in the transmission system, and to flexibly cope with an interpretation related to the operation with a margin.

Note that, although the description of erroneous interpretation is made here, even if the interpretation of ATSC 3.0 is wrong, in a case where the broadcast is broadcasted with the interpretation, it is necessary to process the interpretation as correct, and the erroneous interpretation is interpreted as correct in the broadcast as long as the broadcast is broadcasted with the interpretation (is required to be operated and processed as correct interpretation).

In other words, even in a case where broadcast with different interpretations is performed, it is necessary to enable the broadcast receiving side to perform processing with the interpretation in the broadcast. By enabling such processing, for example, operation with flexibility in interpretation of ATSC 3.0 can be performed. Hereinafter, a device and a method to which the present technology that enables flexible operation in interpretation of ATSC 3.0 is applied will be described.

<Configuration of System>
(Configuration Example of Broadcasting System)

Figure 5:
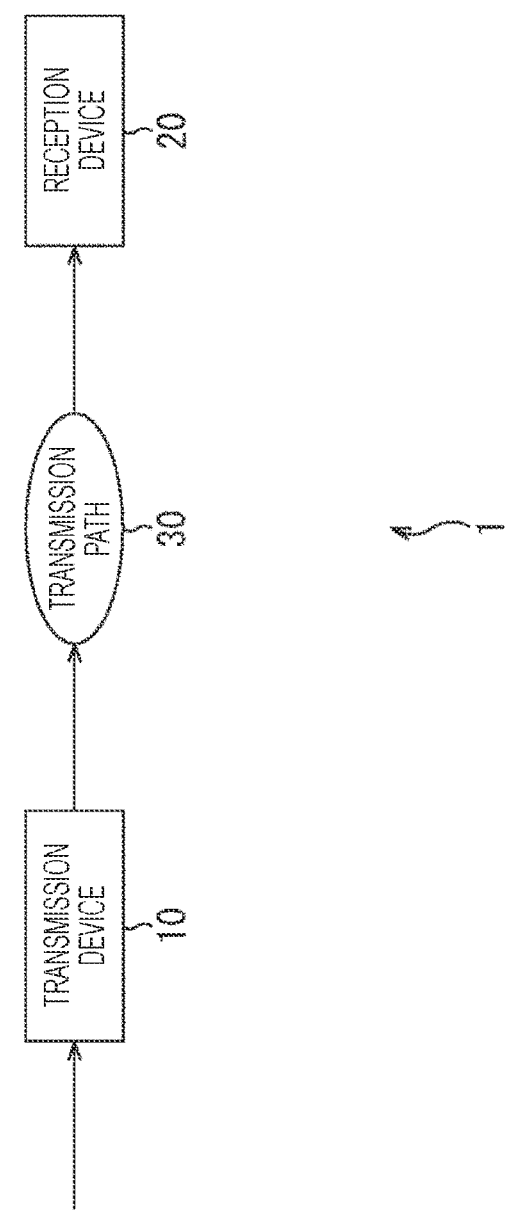
FIG. 5 is a block diagram illustrating a configuration example of a broadcasting system to which the present technology is applied.

FIG. 5 is a block diagram illustrating a configuration example of a broadcasting system to which the present technology is applied. Note that the system refers to a logical assembly of a plurality of devices.

In FIG. 5, a broadcasting system 1 includes a transmission device 10 and a reception device 20. In the broadcasting system 1, data transmission conforming to a predetermined broadcasting system (for example, ATSC 3.0) is performed.

The transmission device 10 performs processing such as modulation and error correction on the data of the content (for example, a television program or the like) input thereto to transmit a broadcast signal obtained as a result thereof through a transmission antenna of a transmission station.

The broadcast signal from the transmission device 10 is received by the reception device 20 via a reception antenna installed in each home of the end user or the like via a transmission path 30. For example, the reception device 20 is configured as a fixed receiver such as a television receiver or a set top box (STB).

The reception device 20 performs processing such as demodulation and error correction on the broadcast signal received via the transmission path 30 to output video and audio data of the content (for example, a television program or the like) obtained as a result.

Note that, in the broadcasting system 1, the transmission path 30 may be, for example, satellite broadcasting using a broadcasting satellite (BS) or a communications satellite (CS), or wired broadcasting (common antenna television (CATV)) using a cable, or the like, in addition to terrestrial waves (terrestrial broadcasting).

(Configuration Example of Reception Device)

Figure 6:
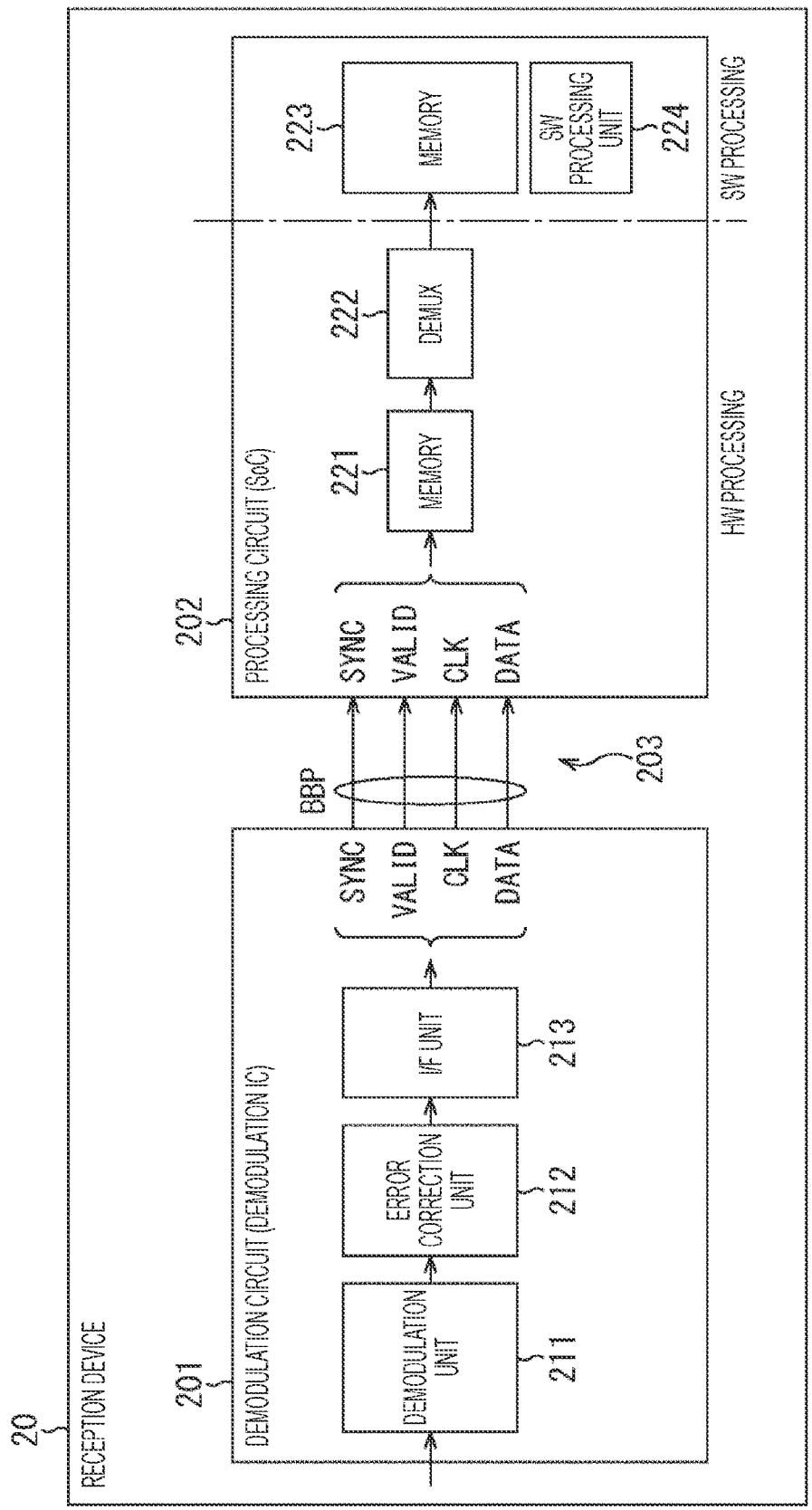
FIG. 6 is a block diagram illustrating a configuration example of a reception device.

FIG. 6 is a block diagram illustrating a configuration example of the reception device 20 in FIG. 5.

In FIG. 6, the reception device 20 includes a demodulation circuit 201 and a processing circuit 202. In the reception device 20, the demodulation circuit 201 and the processing circuit 202 are connected via a predetermined physical interface 203.

The demodulation circuit 201 is configured as a demodulation device such as a demodulation IC. The demodulation circuit 201 demodulates a BB packet obtained from a broadcast signal received via an antenna (not illustrated). In addition, the demodulation circuit 201 adds additional information to be described later to the BB packet to output the BB packet to the processing circuit 202 via the physical interface 203.

The demodulation circuit 201 includes a demodulation snit 211, an error correction unit 212, and an I/F unit 213.

The demodulation unit 211 performs a demodulation process on the broadcast signal received via the antenna, and supplies resulting data to an error correction unit 212.

The error correction unit. 212 performs an error correction decoding process on the data supplied from the demodulation unit 211, and supplies resulting data to the I/F unit 213.

The I/F unit 213 performs a predetermined data process on the data supplied from the error correction unit 212 to output data obtained as a result to the processing circuit 202 via the physical interface 203.

Here, the I/F unit 213 generates information (additional information) regarding the BB packet on the basis of the BB packet obtained from the data from the error correction unit 212, adds the information to the BB packet to output the BB packet to the processing circuit 202 via the physical interface 203.

The processing circuit 202 is configured as a system on chip (SoC). The processing circuit 202 restores the BB packet from the BB packet to which the additional information is added input from the demodulation circuit 201 via the physical interface 203 by using the additional information. The processing circuit 202 processes the restored BB packet (the BB packet demodulated by the demodulation circuit 201).

The processing circuit 202 includes a memory 221, a demux 222, a memory 223, and an SW processing unit 224.

In the processing circuit 202, the processing by the demux 222 on the data recorded in the memory 221 of the preceding stage is hardware processing (HW processing), and is configured to be able to process a BB packet that is an existing method. On the other hand, the processing by the SW processing unit 224 on the data recorded in the memory 223 in the subsequent stage is software processing (SW processing), and can be configured to process the ALP packet (can process on the basis of the software) by updating the software (SW) of the SW processing unit 224.

The BB packet input from the demodulation circuit 201 is extracted on the basis of the accompanying information and written in the memory 221. The demux 222 processes the BB packet written in the memory 221 and writes the processed data in the memory 223 at the subsequent stage. The SW processing unit 224 processes the data written in the memory 223. Here, since (the software processing by) the SW processing unit 224 can process the ALP packet by updating the software (SW), the ALP packet restored from the data arranged in the payload can be processed on the basis of the restoration information included in the header of the BB packet.

Here, technical contents which are a premise to which the present technology is applied will be briefly described.

<Structure of BB Packet>

The BB packet will be described with reference to FIG. 4 again. As illustrated in FIG. 4, the BB packet may have a header part ("Header" illustrated in the figure) and a payload part ("Payload" illustrated in FIG. 4), and a plurality of ALP packets may be included in the payload part. The ALP packet is a variable-length packet that can take different data lengths as represented by a rectangular size in FIG. 4. In addition, respective ALP packets illustrated in FIG. 2 are a first ALP packet, a second ALP packet, ... in order from the left.

The pointer information is stored in the header part of the BB packet. The pointer information is data indicating the position of the boundary of the first ALP packet included in the BB packet, and the head position of the first ALP packet is defined by the pointer information. In addition, the data length of the ALP packet is stored in the header of the ALP packet.

An example of processing of extracting the ALP packet from the BB packet will be described. The processing circuit 202 identifies the head position and the data length of the first ALP packet on the basis of the pointer information acquired from the BB packet, and extracts the first ALP packet. In addition, the processing circuit 202 identifies the head position and the data length of the second ALP packet on the basis of the head position and the data length of the first ALP packet, and extracts the second ALP packet. Hereinafter, similarly, every time the head position and the data length of the ALP packet are identified, the processing circuit 202 identifies the head position and the data length of the next ALP packet and extracts the ALP packet corresponding to the identified head position and data length.

For example, as in The example illustrated above, by identifying the head position and the data length of the ALP packet, the processing circuit 202 can extract the ALP packet that is a variable-length packet from the BB packet.

(Structure of BB Header)

Figure 7:
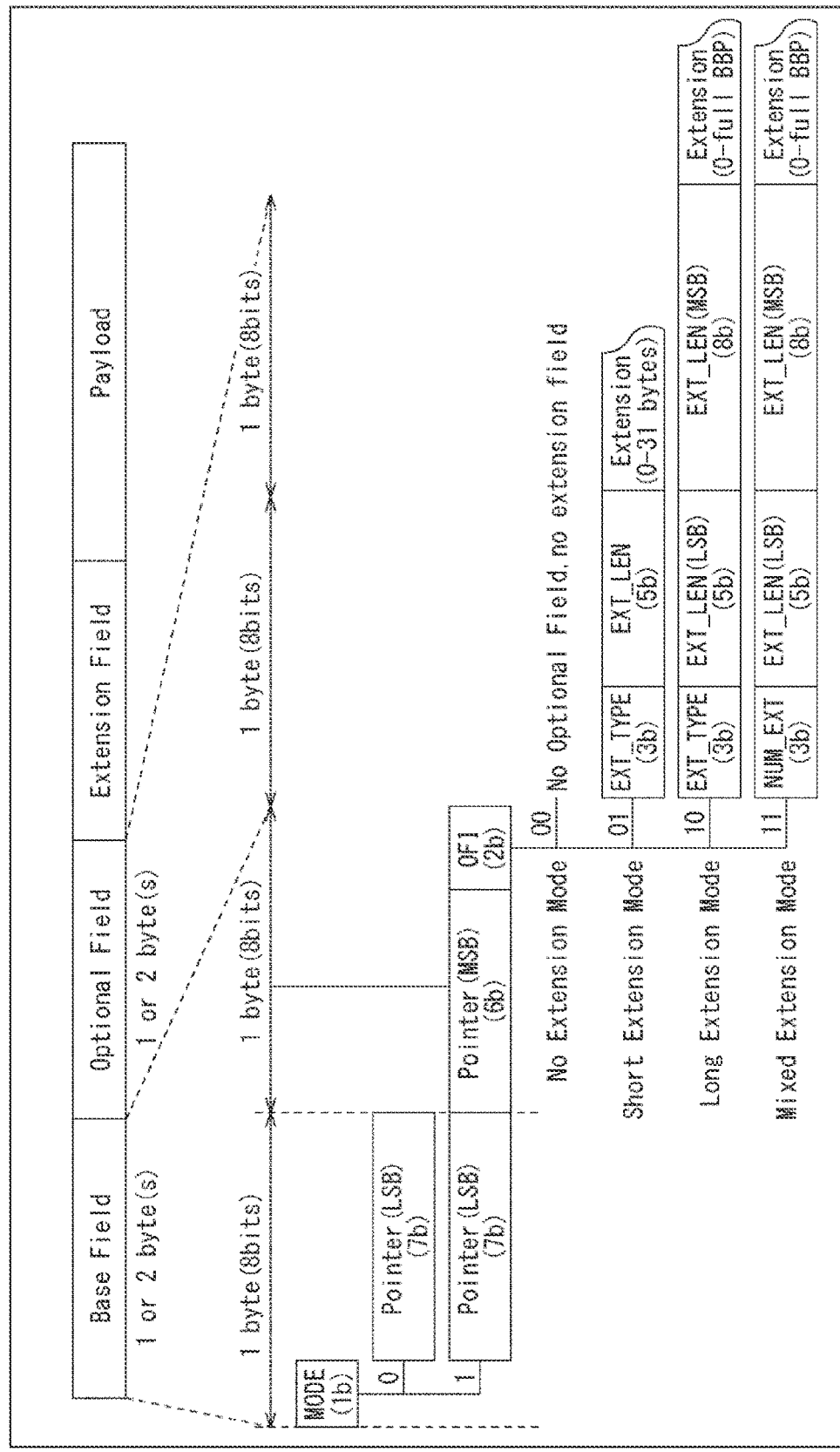
FIG. 7 is a diagram illustrating a structure of a BB header added to a BB packet.

FIG. 7 is a diagram illustrating a structure of a BB header added to a BB packet. In FIG. 7, the BB packet includes a BB header and a payload. In the BB header, an optional field (Optional Field) and an extension field (Extension Field) can be arranged in addition to a base field (Base Field) of 1 or 2 bytes.

That is, in the base field, in a case where "0" is set for the 1-bit mode (MODE), a 7-bit pointer (Pointer (LSB)) is arranged .This pointer is the head ALP pointer described above, and indicates the position of the head ALP packet arranged in the payload of the BB packet. For example, in a case where the data of the ALP packet arranged last in the predetermined BB packet is arranged across the next BB packet, the position of the head ALP packet arranged in the next BB packet can be set for the head ALP pointer.

In addition, in a case where "1" is set for the mode (MODE), a 6-bit pointer (Pointer (MSB)) and 2-bit optional flag (OPTI: OPTIONAL) are arranged in addition to a 7-bit pointer (Pointer (LSB)). The optional flag is information indicating whether or not an optional field (Optional Field) and an extension field (Extension Field) are arranged to extend the header.

In a case where the optional field and the extension field are not extended, "00" is set to the optional flag. In addition, in a case where the optional field of one byte and the extension field are extended, "01" is set to the optional flag, and a short extension mode (Short Extension Mode) is set. On the other hand, in a case where the 2-byte optional field and the extension field are extended, "10" or "11" is set to the optional flag, and a long extension mode (Long Extension Mode) or a mixed extension mode (Mixed Extension Mode) is set.

A 3-bit extension type (EXT_TYPE) is set at the head of the optional field. A type of an extension field (Extension type) is set for the extension type. In the case of the short extension mode, an extension data length (EXT_LEN) of 5 bits and extension data (Extension) of 0 to 31 bytes are arranged following the extension type (EXT_TYPE).

In the case of the long extension mode, an. extension data length of 5 bits (EXT_LEN (LSB)), an extension data length of 8 bits (EXT_LEN (MSB)), and extension data (Extension) of 0 to full BBP are arranged following the extension type (EXT_TYPE). Note that since the mixed extension mode is basically similar to the long extension mode, the description thereof will be omitted.

(Structure of ALP Packet)

Figure 8:
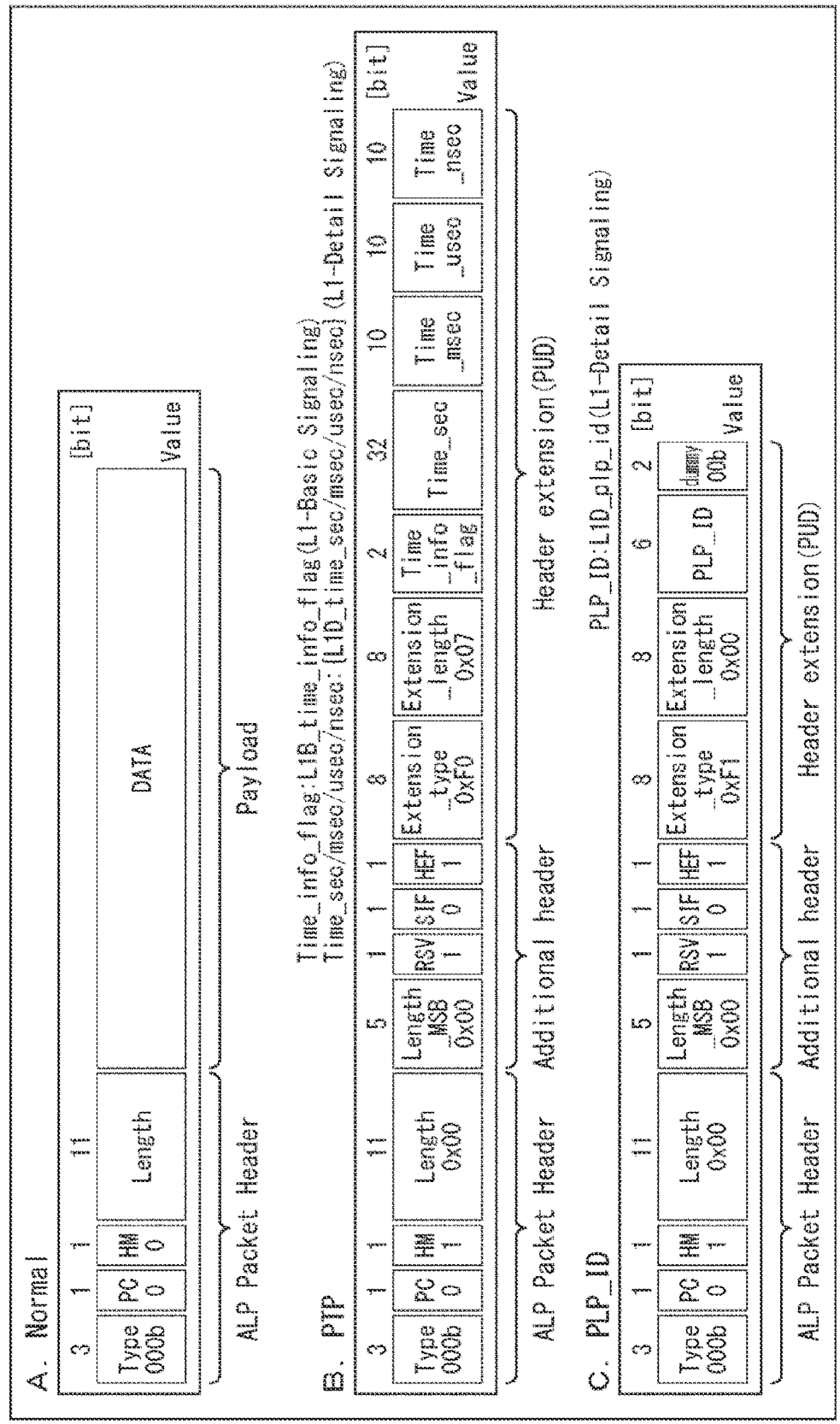
FIG. 8 is a diagram illustrating an example of a structure of an ALP packet.

FIG. 8 is a diagram illustrating an example of a structure of an ALP packet.

(A) Normal

A of FIG. 8 is a diagram illustrating a structure of a normal ALP packet. In A of FIG. 8, a normal ALP packet includes an ALP header (ALP Packet Header) and a payload (Payload).

3-bit Type is set at the head of the ALP header. Information about the type of data arranged in the payload of the ALP packet is set for this Type.

In the ALP header, after Type, a 1-bit payload configuration (PC) is arranged. In a case where '0' is set for the PC, a single packet mode is set according to a 1-bit header mode (HM) to be arranged next, and the 11-bit Length and an ALP extension header (additional header) is arranged in the ALP header.

In the case of a normal ALP packet, '0' is set for the HM, and in the ALP header, the 11-bit Length is arranged following the HM. In addition, in a normal ALP packet, a payload is arranged following an ALP header.

(B) PTP

B in FIG. 8 is a diagram illustrating a structure of an ALP packet (hereinafter, at also referred to as an ALP packet with PTP) in a case where a precision time protocol (PTP) is added to the ALP extension header.

In the ALP packet with PTP, 3-bit Type, 1-bit PC, and 1-bit HM are arranged in the ALP header, and "1" is set for the HM. In a case where "1" is set for the HM, an ALP extension header (Additional header) is arranged following the 11-bit Length.

The ALP extension header (Additional header) includes 5-bit Length_MSB, 1-bit RSV (reserved), 1-bit SIF (Substream Identifier Flag), and 1-bit HEF (Header Extension Flag).

Length_MSB indicates the most significant bit (MSB) of the total payload length of the ALP packet in byte units, and is concatenated with the least significant bit (LSB) indicated by the 11-bit Length of the ALP header co obtain the total payload length.

SIF is a flag indicating whether or not an optional header for a sub stream is arranged. In a case where '0' is set for SIF, it means that the optional header is not arranged.

HEF is a flag indicating whether or not optional header extension is performed. In a case where '1' is set for HEF, header extension is performed. In the ALP header of the ALP packet with PTP in B of FIG. 8, the header extension of 8 bytes is performed with respect to the ALP extension header.

In this header extension, 8-bit Extension_type, 8-bit Extension_length, 2-bit Time_info_flag, 32-bit Time_sec, 10-bit Time_msec, 10-bit Time_usec, and 10-bit Time_nsec are arranged. In this example, since PTP (time information) designated by Time_sec, Time_msec, Time_usec, and Time_nsec is arranged according to Time_info_flag as private user data (PUD), values of a type and a length corresponding to this arrangement are set to Extension_type and Extension_length, respectively.

Here, PTP is time information defined by IEEE 1588-2008. The PTP includes a second field and a nanosecond field, and can correspond to accuracy in nanoseconds. PTP is included in the preamble of the physical layer frame, for example, indicates the time of the head of the physical layer frame, and is used as time information of clock recovery performed on the reception side.

For example, in a case of Time_info_flag='0', time information in seconds (Time_sec) and time information in milliseconds (Time_msec) are arranged. In addition, for example, in a case of Time_info_flag='10', the time information in microseconds (Time_usec) is arranged in addition to the time information in seconds and milliseconds (Time_sec, Time_msec). In addition, for example, in a case of Time_info_flag='11', time information in nanoseconds (Time_nsec) is arranged in addition to the time information in seconds, milliseconds, and microseconds (Time_sec, Time_msec, Time_usec).

Note that, for example, in ATSC 3.0, 2-bit L1B_time_info_flag defined in L1B signaling (L1-Basic Signaling) corresponds to Time_info_flag. Further, for example, in ATSC 3.0, 32-bit L1D_time_sec, 10-bit L1D_time_msec, 10-bit L1D_time_usec, and 10-bit L1D_time_nsec defined in L1D signaling (L1-Detail Signaling) correspond to Time_sec, Time_msec, Time_usec, and Time_nsec, respectively.

Details of the L1B signaling and the L1D signaling are disclosed in Non-Patent Document 1 described above.

(C) PLP_ID

C of FIG. 8 is a diagram illustrating a structure of an ALP packet (hereinafter, it is also referred to as an ALP packet with PLP_ID) in a case where PLP_ID is added to the ALP extension header.

In the ALP packet with PLP_ID, 3-bit Type, 1-bit PC, and 1-bit HM are arranged in the ALP header, and '1' is set for the HM. In a case where '1' is set for the HM, an ALP extension header (Additional header) is arranged following the 11-bit Length.

The ALP extension header includes 5-bit Length_MSB, 1-bit RSV, 1-bit SIF, and 1-bit HEF.

In the ALP header of the ALP packet with PLP_ID in C of FIG. 8, '1' is set for HEF, and 3-byte header extension is performed for the ALP extension header.

8-bit Extension_type, 8-bit Extension_length, 6-bit PLP_ID, and 2-bit dummy data (dummy) are arranged in the header extension. In this example, since 6-bit PLP_ID is arranged as private user data (PUD), values of a type and a length corresponding to this arrangement are set to Extension_type and Extension_length, respectively.

Note that 6-bit L1D_plp_id defined in L1D signaling (L1-Detail Signaling) corresponds to PLP_ID in ATSC 3.0, for example. PLP_ID is not required in the case of the single PLP (S-PLP) mode, but is required to identify PLP in the case of the multiple PLP (M-PLP) mode. Details of the L1D signaling are disclosed in Non-Patent Document 2 below. In addition, details of the structure of the ALP packet are disclosed in Non-Patent Document 1 described above.

Non-Patent Document 2: ATSC Standard: Physical-Link-Layer Protocol (A/322)

<Additional Information>

As described with reference to FIG. 6, the BB packet is output from the demodulation circuit 201, and the processing circuit 202 extracts the ALP packet by processing the BB packet.

As described with reference to FIG. 7, the header part of the BB packet includes the pointer indicating the head of the ALP packet included in the BB packet, and the like. The processing circuit 202 can extract the ALP packet from the BB packet by using the information included in the header Part of the BB Packet.

The processing circuit 202 receives BB packets in succession supplied from the demodulation circuit 201. In a case where BB packets come in succession, it is necessary to accurately recognize and process the head of the BB packet. In the header part of the BB packet, as described above, the information about the ALP packet included in the BB packet is described, but the information about the BB packet itself, for example, the information such as the length of the BB packet, is not described.

Therefore, in a case where receiving in succession the BB packets described with reference to FIGS. 4 and 7 from the demodulation circuit 201, the processing circuit 202 may not be able to accurately recognize the head of the BB packet and may not be able to accurately extract the BB packet. Therefore, the demodulation circuit 201 adds the additional information as illustrated in FIG. 9 to the BB packet to output the BB packet to the processing circuit 202.

For example, the I/F unit 213 of the demodulation circuit 201 adds the additional information illustrated in FIG. 9 to the BB packet supplied from the error correction unit 212 to output the BB packet to the processing circuit 202 via the physical interface 203.

Referring to FIG. 9, the additional information roughly includes a delimiter (DELIMITER) part, a precision time protocol (PTP) information part, and a BB packet information part. Since the additional information illustrated in FIG. 9 indicates a case where the additional information is added before the BB packet, the additional information indicates a configuration in which the BB packet follows the BB packet information part. In this case, the BB packet can be treated as a BB packet in which a header including information about the BB packet itself is added to the BB packet.

Part or all of the additional information may be included in the BB packet, and the example illustrated in FIG. 9 is not a description indicating that it is limited to the embodiment in which all of the additional information is added before the BB packet. In the following description, a case where additional information is added before the BB packet as illustrated in FIG. 9 will be described as an example.

In such a case, additional information is added like a header before a header (for example, "Header" illustrated in FIG. 4) included in the BB packet itself. The additional information is also appropriately described as an addition header.

The delimiter part is used as information indicating a BB packet delimiter (boundary) and is information that can be used for synchronization The example illustrated in FIG. 9 illustrates an example in which the delimiter part is arranged in the first to fourth bytes and is configured by four bytes. The delimiter part is not limited to four bytes, and may be any number of bytes. In addition, a random sequence may be used.

At the start of transmission of the first byte of the delimiter part, SYNC (FIG. 6) of the physical interface 203 is set to the H level.

In the example illustrated in FIG. 9, the PTP information part is arranged in the 5th to 12th bytes. The information described in the PTP information part can be information similar to the PTP information included in the header of the ALP packet described with reference to B of FIG. 8. The PTP information related to the ALP packet described with reference to B in FIG. 8 is different from the PTP information included in the additional information in FIG. 9 in that the PTP information included in the additional information in FIG. 9 is PTP information related to the BB packet, but the information may be Time_info_flag, Time_sec, Time_msec, Time_usec, and Time_nsec.

Although the description has been given with reference to B of FIG. 8, the description will be added again as the information about the PTP information part. 2-bit Time_info_flag, 32-bit Time_sec, 10-bit Time_msec, 10-bit Time_usec, and 10-bit Time_nsec are arranged in the PTP information part. PTP is time information defined by IEEE 1588-2008. The PTP includes a second field and a nanosecond field, and can correspond to accuracy in nanoseconds. PTP is included in the preamble of the physical layer frame, for example, indicates the time of the head of the physical layer frame, and is used as time information of clock recovery performed on the reception side.

For example, in a case of Time_info_flag='0', time information in seconds (Time_sec) and time information in milliseconds (Time_msec) are arranged. In addition, for example, in a case of Time_info_flag='10', the time information in microseconds (Time_usec) is arranged in addition to the time information in seconds and milliseconds (Time_sec, Time_msec). In addition, for example, in a case of Time_info_flag='11', time information in nanoseconds (Time_nsec) is arranged in addition to the time information in seconds, milliseconds, and microseconds (Time_sec, Time_msec, Time_usec).

Note that, for example, in ATSC 3.0, 2-bit L1B_time_info_flag defined in L1B signaling (L1-Basic Signaling) corresponds to Time_info_flag. Further, for example, in ATSC 3.0, 32-bit L1D_time_sec, 10-bit L1D_time_msec, 10-bit L1D_time_usec, and 10-bit L1D_time_nsec defined in L1D signaling (L1-Detail Signaling) correspond to Time_sec, Time_msec, Time_usec, and Time_nsec, respectively.

Time information about the BB packet is described in the PTP information part of the additional information, and the time information conforms to ATSC 3.0.

Information about the BB packet is described in the BB packet information part included in the additional information The BB packet information part includes "BBPLOCK", "BCHERR", "FECTYPE", "COD", "PLPID SEL", and "PLPID".

"BBPLOCK" is information indicating whether or not reception is stable, and is data represented by four bits. "BBPLOCK" is information provided for each PLP. Since the demodulation circuit 201 is only required to have an ability to process up to four PLPs, "BBPLOCK" is 4-bit data, and 1 bit is associated with 1 PLP.

"BCHERR" is 1-bit information indicating whether or not there is an error in the BB packet to which the additional information is added The additional information is added by the I/F unit 213 (FIG. 6), and the BB packet whose error has been corrected by the error correction unit 212 is supplied to the I/F unit 213. Data indicating whether or not an error remains in the BB packet in which the error is corrected is "BCHERR".

"FECTYPE" is 3-bit data indicating the code length of the BB packet (information indicating the type of forward error correction (FEC)). "COD" is 4-bit data representing a coding rate of the BB packet. The length (Length) of the BB packet can be obtained from the "FECTYPE" and the "COD" (described later). Instead of "FECTYPE" and "COD", data indicating the length of the BB packet itself may be described. By describing the length of the BB packet itself, the processing amount in the processing circuit 202 can be reduced.

"PLPID SEL" is 2-bit data representing a physical layer pipe (PLP) ID of the BB packet, and is data representing a relative ID. "PLPID" is also data representing the PLPID of the BB packet, and is 6-bit data representing an absolute ID. From "PLPID SEL" and "PLPID", the processing circuit 202 can identify the ALP packet of the PLP to be processed included in the BB packet.

Here, for example, in ATSC 3.0, the transmission system on the transmission side can support up to 64 PLPs for each predetermined frequency band. For example, the PLP can be set for each mobile service or each stationary service, and the transmission system side can support up to 64 PLPs (services). In addition, it is configured such that the strength of FEC can be changed for each PLP.

On the other hand, the reception system (for example, the reception device 20 illustrated in FIG. 6) on the reception side is required to simultaneously receive up to four PLPs. By causing the reception device 20 on the reception side to simultaneously receive a plurality of PLPs, it is possible to provide, for example, sound with higher robustness, video with higher quality, and the like.

For example, a stream including four PLPs of PLP #0 to PLP #3 is received and processed as the broadcast stream input to the reception device 20. In PLP #0 to PLP #3, for example, LLS signaling (Signaling) is transmitted in PLP #0, robust audio (Robust Audio) is transmitted in PLP #1, video (base video) (Video) and audio (Audio) are transmitted in PLP #2, and enhanced video (Enhanced Video) is transmitted in PLP #3.

In a case where the demodulation unit 211 of the demodulation circuit 201 (FIG. 6) performs the demodulation process on PLP #0 to PLP #3, the BB packet is extracted for each PLP and supplied to the error correction unit 212. The error correction unit 212 is configured to be able to support up to four PLPs as described above. For example, although not illustrated, the error correction unit 212 includes four FEC processing units that process FEC.

Up to four PLPs are supplied from the error correction unit 212 to the I/F unit 213. The I/F unit 213 processes the BB packet input for each PLP, to output the BB packet to the processing' circuit 202 via the physical interface 203. As described above, when outputting the BB packet, the I/F unit 213 adds and outputs the additional information including the information about the BB packet itself.

On the other hand, the BB packet (BB packet to which additional information is added) is input to the processing circuit 202 from the demodulation circuit 201 via the physical interface 203. (The demux 222 of) the processing circuit 202 processes the BB packet, thereby extracting the ALP packet from the BB packet.

Here, the BB packet from the demodulation circuit 201 includes "PLPID SEL" and PLPID "as the additional information Therefore, in the reception device 20, even if the BB packet obtained from each PLP (PLP #0 to PLP #3) is transmitted between the demodulation circuit 201 and the processing circuit 202 through the single physical interface 203, the processing circuit 202 can identify to which PLP the BB packet (ALP packet) input from the demodulation circuit 201 belongs by "PLPID SEL" and "PLPID" included in the additional information.

In this manner, the demodulation circuit 201 generates the additional information described with reference to FIG. 9, adds the additional information to the BB packet to output the BB packet, so that the processing circuit 202 as an output destination can appropriately process the BB packet.

In addition, the demux 222 of the processing circuit 202 can appropriately extract each BB packet from the BB packets supplied in succession by using the accompanying information and extract the ALP packet included in each BB packet.

Furthermore, the ALP packet extracted by the demux 222 is processed by the SW processing unit 224. By making the software of the SW processing unit 224 software adapted to the interpretation of the standard (for example, the ATSC 3.0 standard) in the broadcast station, the ALP packet can be processed on the basis of the interpretation of the standard on the broadcast station side.

Even if the broadcast station does not operate with the interpretation in accordance with the standard, the processing is performed by the interpretation by the broadcast station side, so that it is possible to prevent a situation in which the ALP packet cannot be processed from occurring.

The additional information illustrated in FIG. 9 will be further described. The additional information illustrated in FIG. 9 is described by exemplifying a case where three pieces of information, that is, information regarding the delimiter part, information regarding the PTP information part, and information regarding the BB packet information part, are included. As the additional information to be added to the BB packet, three pieces of information about the delimiter part, the PTP information part, and the BB packet information part may be included, two pieces of information among the three pieces of information may be included, or one piece of information may be included.

That is, the information included in the additional information has a degree of freedom, and the additional information illustrated in FIG. 9 is an example and is not a description indicating limitation.

As illustrated in A of FIG. 10, the additional information illustrated in FIG. 9 is added before the BB packet. In this case, it is added before the header of the BB packet itself ("Header" of the BB packet in FIG. 4).

In addition, as illustrated in B of FIG. 10, part of the additional information illustrated in FIG. 9 may be added before the header of the BB packet the BB packet itself, and the rest of the additional information may be included in the BB packet. In a case where part of the additional information is inserted into the BB packet, one or two of the three pieces of information illustrated in FIG. 9 can be inserted into the BB packet, and the remaining two or one piece of information can be added before the header of the BB packet.

Furthermore, as illustrated in C of FIG. 10, all the additional information illustrated in FIG. 9 may be included in the BB packet. In this case, the additional information illustrated in FIG. 9 may be collectively inserted into a predetermined position in the BB packet, or the additional information may be divided and inserted into a plurality of positions in the BB packet.

In this manner, the additional information has a degree of freedom with respect to which part of the BB packet it is added.

In addition, information other than the additional information illustrated in FIG. 9 may be further added. For example, a cyclic redundancy check (CRC) may be attached as error correction information for the additional information. In a case where the CRC, is added, the CRC can be added in the 16th byte.

In addition, information about the additional information may be included in the additional information. For example, the information about the additional information is 4-bit data of [a, b, c, d].

[a] can be a flag indicating the presence or absence of a delimiter, for example, in the case of "0", the flag can indicate the absence of the delimiter part, and in the case of "1", the flag can indicate the presence of the delimiter part. [b] can be a flag indicating the presence or absence of the PTP information part, for example, in a case of "0", the flag can indicate the absence of the PTP information part, and in a case of "1", the flag can indicate the presence of the PTP information part. [c] can be a flag indicating the presence or absence of the BB packet information part, for example, in the case of "0", the flag can indicate the absence of the BB packet information part, and in the case of "1", the flag can indicate the presence of the BB packet information part.

The BB packet may be further subdivided and flagged, for example, set to [d]. In addition, the information about the additional information may be data of 4 bits or more.

In addition, here, the description is made in which the additional formation is added to the BB packet to output from the demodulation circuit 201 to the processing circuit 202, but a dedicated signal line for transmitting the additional information may be provided between the demodulation circuit 201 and the processing circuit 202, and the additional information may be transmitted through the signal line. For example, FIG. 6 illustrates a case where four signal lines are wired as the physical interface 203, but a configuration in which one signal line is further added may be used, and the additional information may be transmitted through the added signal line.

In addition, in a case where the additional information is transmitted via the signal line, all of the additional information illustrated in FIG. 9 may be transmitted via the signal line, or one or two of the three pieces of information may be transmitted via the signal line, and the remaining two or one piece of information may be added (or inserted) to the BB packet and transmitted, as in the case described above.

In a case where the information about the PTP information part among the three pieces of additional information illustrated in FIG. 9 is transmitted via a dedicated signal line, the PTP information can be transmitted with high timing accuracy, compared with in a case where the information about the PTP information part is added to the BB packet and transmitted.

In a case where the additional information is transmitted by providing a dedicated signal line, the additional information transmitted via the dedicated signal line is excluded from the additional information to be added to the BB packet. For example, the information about the PTP information part can be transmitted through a dedicated signal line, and the information about the delimiter part and the BB packet information part can be added to the BB packet and transmitted.

Note that when the additional information and the BB packet (the BB packet to which the additional information is added) are transmitted from the demodulation circuit 201 to the processing circuit 202, the additional information and the BB packet may be transmitted in parallel or in serial.

In addition, when the additional information and the BB packet (the BB packet to which the additional information is added) are transmitted from the demodulation circuit 201 to the processing circuit 202, it is not necessary to use a physical interface (physical interface 203 having signal lines of "sync", "VALID", "CLK", and "DATA" illustrated in FIG. 6) of the MPEG2-TS system. For example, additional information and the BB packet (the BB packet to which additional information is added) may be transmitted from the demodulation circuit 201 to the processing circuit 202 using a physical interface such as a serial peripheral interface (SPI) or a universal serial bus (USB).

In addition, a signal line for transmitting an error signal may be provided. When an error occurs in the demodulation circuit 201, a signal line for transmitting the error to the processing circuit 202 may be provided in the physical interface 203. By transmitting the error signal through the signal line, the processing circuit 202 can instantaneously detect the error.

The additional information illustrated in FIG. 9 is an example, and as described above, for example, "FECTYPE" and "CCD" included in the BB packet information part may be data representing the packet length of the BB packet itself instead of "FECTYPE" and "COD". Here, "FECTYPE" and "COD" will be described.

<"FECTYPE" and "COD">

Figure 11:
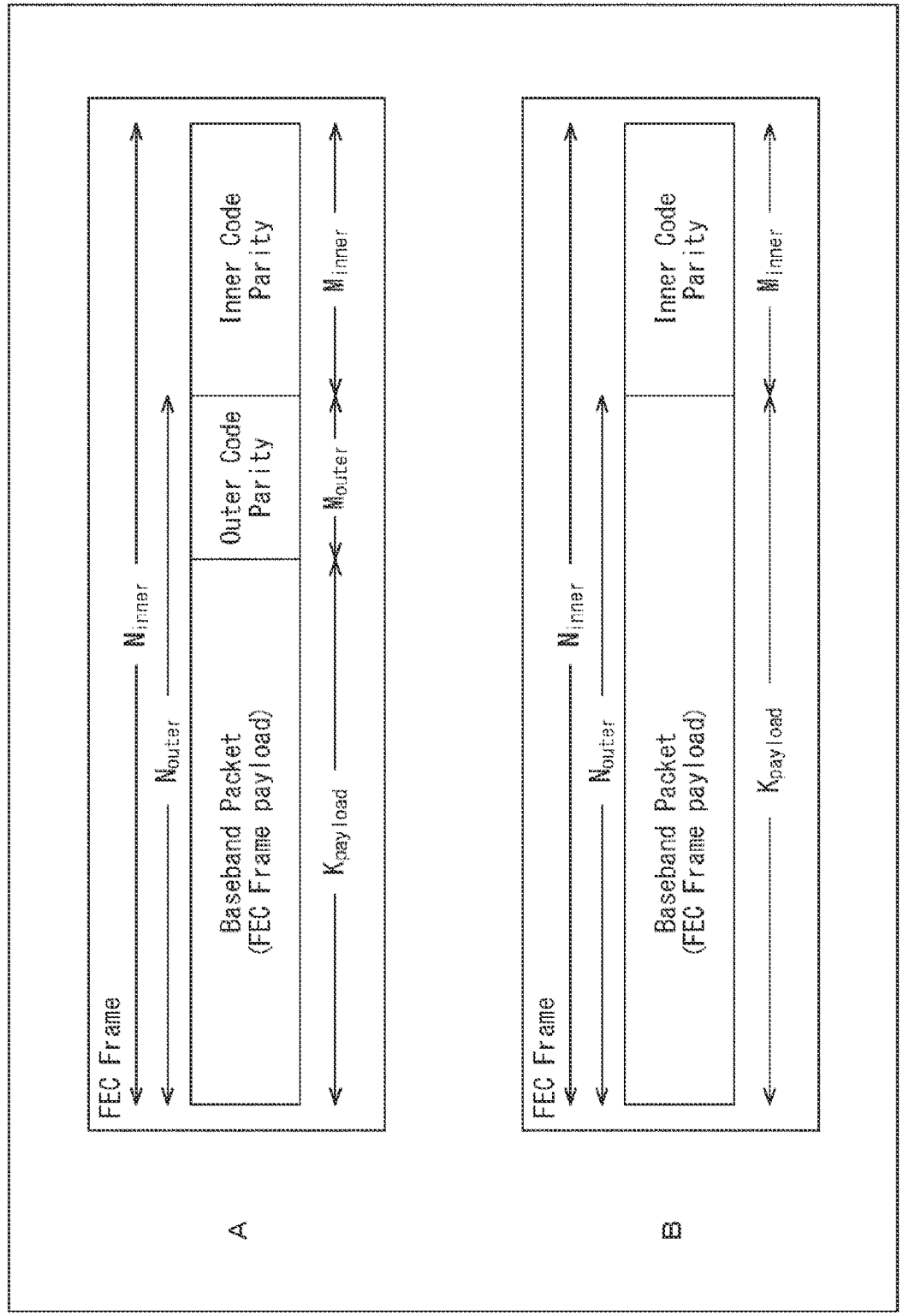
FIG. 11 is a diagram for explaining a configuration of an FEC frame.

FIG. 11 is a diagram illustrating a configuration example of an FEC frame. The FEC frame is, for example, a frame that is demodulated by the demodulation unit 211 (FIG. 6) of the demodulation circuit 201 and supplied to the error correction unit 212.

As the FEC frame, a case of the configuration illustrated in A of FIG. 11 and a case of the configuration illustrated in B of FIG. 11 are provided. The FEC frame illustrated in A of FIG. 11 includes a baseband packet (BB packet (FEC Frame payload)), an outer code parity (Outer Code Parity), and an inner code parity (Inner Code Parity).

The FEC frame illustrated in B of FIG. 11 includes a baseband packet (BB packet (FEC Frame payload)) and an inner code (Inner Code Parity).

A frame length of the FEC frame illustrated each in A of FIG. 11 and B of FIG. 11 is Ninner bits. The packet length of the BB packet of the FEC frame illustrated in A of FIG. 11 is Kpayload bits, the length of the outer code parity is Mouter bits, and the length of the inner code parity is Minner bits. Further, in the FEC frame illustrated in A of FIG. 11, a total length of the BB packet and the outer code parity is defined as Nouter bit.

The FEC frame illustrated in A of FIG. 11 is a frame that satisfies the following relationship:

Ninner=Nouter+Minner=Kpayload+Mouter+Minner

The packet length of the BB packet of the FEC frame illustrated in B of FIG. 11 is Kpayload bits, and the length of the inner code parity is Minner bits. In addition, in the case of the FEC frame illustrated in B of FIG. 11, the length of the BB packet is Nouter bit, and Nouter bit=Kpayload bit.

The FEC frame illustrated in B of FIG. 11 is a frame that satisfies the following relationship:

Ninner=Nouter+Minner=Kpayload+Minner

In this manner, the FEC frame is divided depending on whether or not the FEC frame includes the outer code parity. In addition, BCH and CRC are used as outer codes. The combination of the outer code and the inner code is defined as in the table illustrated in FIG. 12.

A value on the left side in the drawing is a value used as FECTYPE [2:0]. In a case where FECTYPE [2:0] is "000", it indicates an FEC frame in which BCH is used as an outer code and 16K LDPC is used as an inner code. In a case where FECTYPE [2:0] is "001", it indicates an FEC frame in which BCH is used as an outer code and 64K LDPC is used as an inner code.

In a case where FECTYPE [2:0] is "010", it indicates an FEC frame in which CRC is used as an outer code and 16K LDPC is used as an inner code. In a case where FECTYPE [2:0] is "011", it indicates an FEC frame in which CRC is used as an outer code and 64K LDPC is used as an inner code.

In a case where FECTYPE [2:0] is "100", it indicates that the frame is an FEC frame in which there is no outer code and 16K LDPC is used as an inner code. In a case where FECTYPE [2:0] is "100", it indicates that the frame is an FEC frame in which there is no outer code and 16K LDPC is used as an inner code.

In a case where FECTYPE [2:0] is "000", "000", "010", or "011", the FEC frame has the configuration illustrated in A of FIG. 11 and includes the outer code parity. In a case where FECTYPE [2:0] is "100" or "101", the FEC frame has the configuration illustrated in B of FIG. 11 and does not include the outer code parity.

In addition, a case where FECTYPE [0] is "0" is a case where 16K LDPC is used as an inner code, and a case where FECTYPE [0] is "1" is a case where 64K LDPC is used as an inner code. In addition, in a case of FECTYPE [0]="0", Ninner=16200 bits is specified, and in a case of FECTYPE [0]="1", Ninner=64800 bits is specified.

Kpayload indicating the packet length of the BB packet is specified as illustrated in the table illustrated in FIG. 13. The upper diagram in FIG. 13 is a table related to Kpayload in a case of Ninner=64800bits, and the lower diagram in FIG. 13 is a table related to Kpayload in a case of Ninner=16200 bits. Since the description related to this table is made in Non-Patent Document 2 described above, the description will be continued with an example.

Referring to the upper diagram in FIG. 13, 12 code rates are set as the code rate. Code Rate represents a coding rate of the LDPC. In addition, Code Rate satisfies the relationship of the following formula:

Code Rate=(COD[3:0]+2)/1.5

For example, in a case where the Code Rate is "2/15", the outer code is BCH, and the inner code is 64K LDPC (FECTYPE [2:0]="001"), the "8448" bit that is a value at which "2/15" of Code Rate and Kpayload (BCH) of the outer code in the upper diagram of FIG. 13 intersect is the packet length Kpayload of the BB packet.

Referring again to FIG. 9, FECTYPE [2:0] and COD [3:0] are described in the BB packet information part. It is possible to identify whether Ninner=16200 or Ninner=64800 from FECTYPE [2:0] and to identify whether the outer code is BCH or CRC, or absence of outer code. Therefore, from FECTYPE [2:0] and COD [3:0], it is possible to identify where the packet length Kpayload corresponds in the table illustrated FIG. 13 to identify the packet length Kpayload of the BB packet.

As described with reference to FIG. 9, FECTYPE [2:0] and COD [3:0] may be described as the information about the packet length of the BB packet to which the additional information is added, or a value of the packet length that can be uniquely identified from FECTYPE [2:0] and COD [3:0] may be written. In addition, in a case where a value of the packet length (a value of the packet length itself of the BB packet) that can be uniquely identified from FECTYPE [2:0] and CCD [3:0] is included in the additional information, a value obtained by dividing the packet length Kpayload by 8, that is, a value obtained by converting the bit length into the byte length, may be described.

<Comparison with Conventional Example>

Here, a case of transmitting the ALP packet from the demodulation circuit 901 to the processing circuit 902 described with reference to FIG. 1 will be considered. The packet length of the ALP packet is variable from 0 to 65797 bytes, and can take any value from 0 to 65797 bytes. Therefore, the processing circuit 902 is required to be configured to be able to process a packet of any packet length as the ALP packet.

On the other hand, in the present embodiment, the BB packet is transmitted from the demodulation circuit 201 (FIG. 6) to the processing circuit 202. The packet length of the BB packet is a length between 249 and 7020 bytes, and a possible value is also limited. Specifically, in FIG. 13, the packet length is limited to the packet length Kpayload surrounded by a black frame square. That is, the BB packet has only 72 packet lengths.

According to the present embodiment, since the processing circuit 202 handles a BB packet having a limited packet length, processing in the processing circuit 202 can be reduced.

In addition, when one PLP (service) is determined, one code length is determined, so that the processing of the processing circuit 202 can be reduced also in this respect. As described above, the error correction unit 212 of the demodulation circuit 201 is configured to be able to support up to four PLPs. The error correction unit 212 processes the FEC frame described with reference to FIG. 11.

When a predetermined PLP is processed, if the PLP (service) does not change, the FECTYPE or the like of the FEC frame of the PLP does not change. When the code length of the FEC frame of the PLP is known at the start of processing of the predetermined PLP, the code length does not change from the start of processing. Therefore, since the packet length Kpayload of the BB packet output from the demodulation circuit 201 to the processing circuit 202 does not change, the processing circuit 202 can perform processing by performing setting with an expectation of a BB packet with the same packet length after processing the first BB packet, and the processing can be performed without determining the code length, so that the processing can be reduced.

<Processing of Demodulation Circuit>

Figure 14:
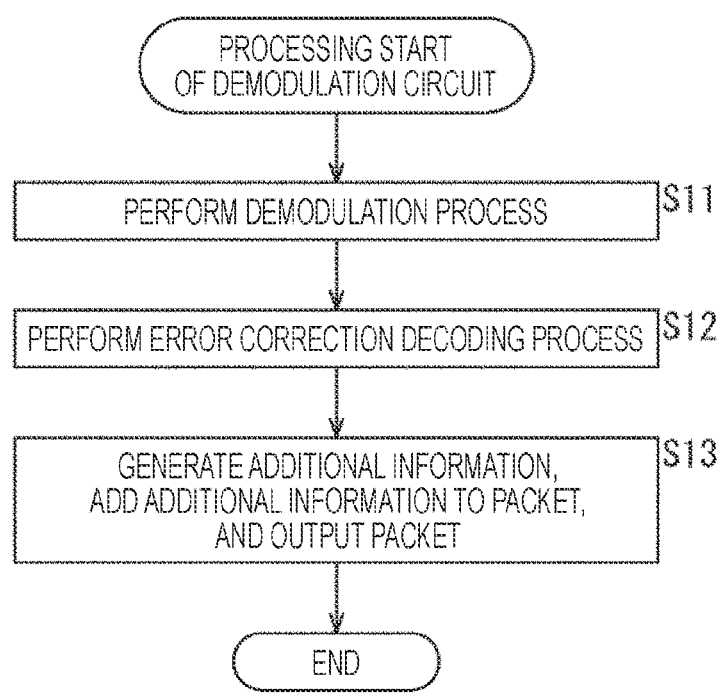
FIG. 14 is a flowchart for explaining processing of a demodulation circuit.

Next, processing executed by the demodulation circuit 201 of the reception device 20 (FIG. 6) will be described with reference to the flowchart of FIG. 14.

In step S11, the demodulation process is performed on the RF signal (OFDM signal) transmitted from the transmission device 10 (FIG. 5) via the transmission path 30.

In step S12, the error correction unit 212 performs an error correction decoding process on the data demodulated in the process of step S11. In this error correction decoding process, processes such as LDPC decoding by an LDPC decoder included in the error correction unit 212, BCH decoding by a BCH decoder, and CRC decoding by a CRC decoder, and the like are performed.

In step S13, the additional information is added to the data subjected to the error correction decoding process in the process of step S12. The BB packet subjected to the error correction decoding is output from the error correction unit 212 and supplied to the I/F unit 213. For example, the I/F unit 213 generates the additional information described with reference to FIG. 9, adds the additional information to the input BB packet to output the input BB packet to the processing circuit 202 via the physical interface 203.

In this manner, the BB packet to which the additional information is added is supplied from the demodulation circuit 201 to the processing circuit 202. Therefore, for example, even in a case where a difference occurs in the interpretation of the ALP format depending on the broadcast station, the demodulation circuit 201 can perform processing without being affected by the difference. In addition, in a case where the processing circuit 202 conforms to BB packet processing, it can process the BB packet from the demodulation circuit 201, and can also process the ALP packet included.

<Embodiment of Dividing BB Packet>

As described above, the BB packet is output from the demodulation circuit 201. As described above, the process by the processing circuit 202 is reduced by handling the BB packet. Furthermore, the DB packet may be divided, and the divided BB packet may be transmitted from the demodulation circuit 201 to the processing circuit 202.

For example, a case where the BB packet is divided on a 188 bytes basis to output will be described as an example. In the related art, for example, a system such as an MPEG2 transport stream (TS) system has been used. For example, the packet length used in the MPEG2-TS system that has been used in the related art is 188 bytes, and it is considered that the affinity with the conventional processing circuit can be increased by using such a packet length, and the processing can be further reduced.

Figure 15:
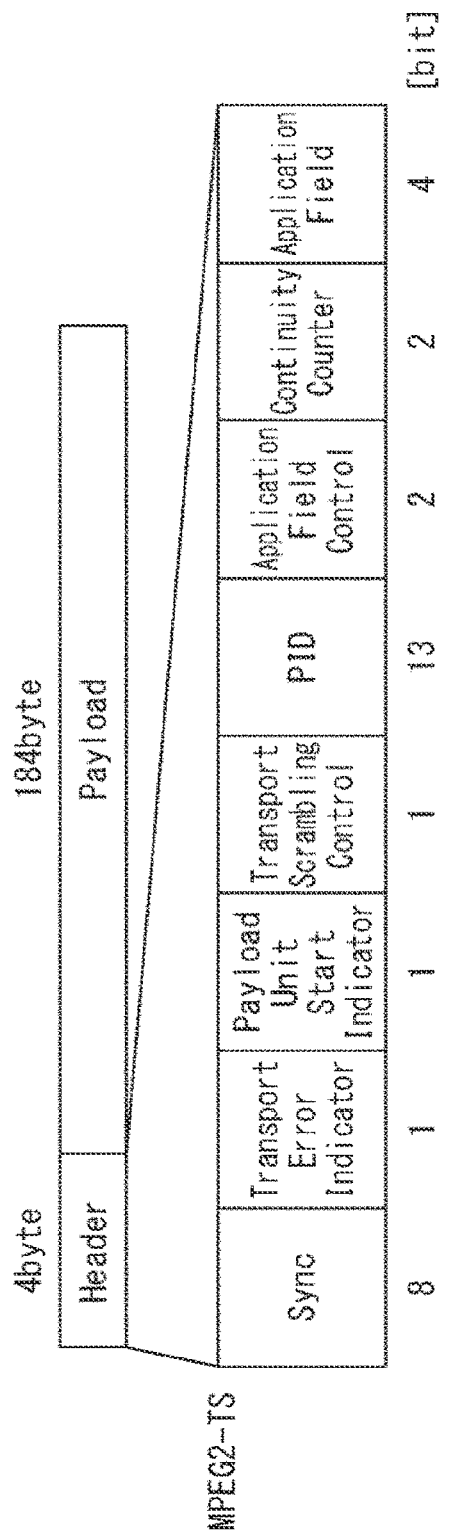
FIG. 15 is a diagram illustrating an example of a structure of a TS packet.

Here, as an example, a structure of a TS packet with 188 bytes will be described FIG. 15 is a diagram illustrating an example of a structure of a TS packet.

The TS packet includes a 4-byte header and a 184-byte payload. Therefore, the packet length of the TS packet is 188 bytes.

8-bit Sync, 1-bit Transport Error Indicator, 1-bit Payload Unit Start Indicator, 1-bit Transport Scrambling Control, 13-bit PID, 2-bit Application Field Control, 2-bit Continuity Counter, and 4-bit Application Field are arranged in the 4-byte header.

Sync is a synchronous byte, and is set to, for example, '0x47'. Transport Error Indicator is a flag indicating the presence or absence of a bit error in the target TS packet. For example, in a case where Transport Error Indicator is '1', it indicates that an uncorrectable error of at least one bit exists in the TS packet.

In a case where Payload Unit Start Indicator is '1', it indicates that the start point of the payload of the target TS packet is the start point of the PES packet or the pointer. Transport Scrambling Control is a region used to identify a scrambling mode of a payload of the target TS packet. The scrambling control value is determined in advance.

PID is a region used to identify a type of data of the payload of the target TS packet. Application Field Control is a flag indicating the presence or absence of Application Field or The payload in the target TS packet.

Continuity Counter is a continuity index used to check whether or not a packet is missing, and is incremented by 1 every time a packet of the same DID is received The Application Field is a region of an application.

Figure 16:
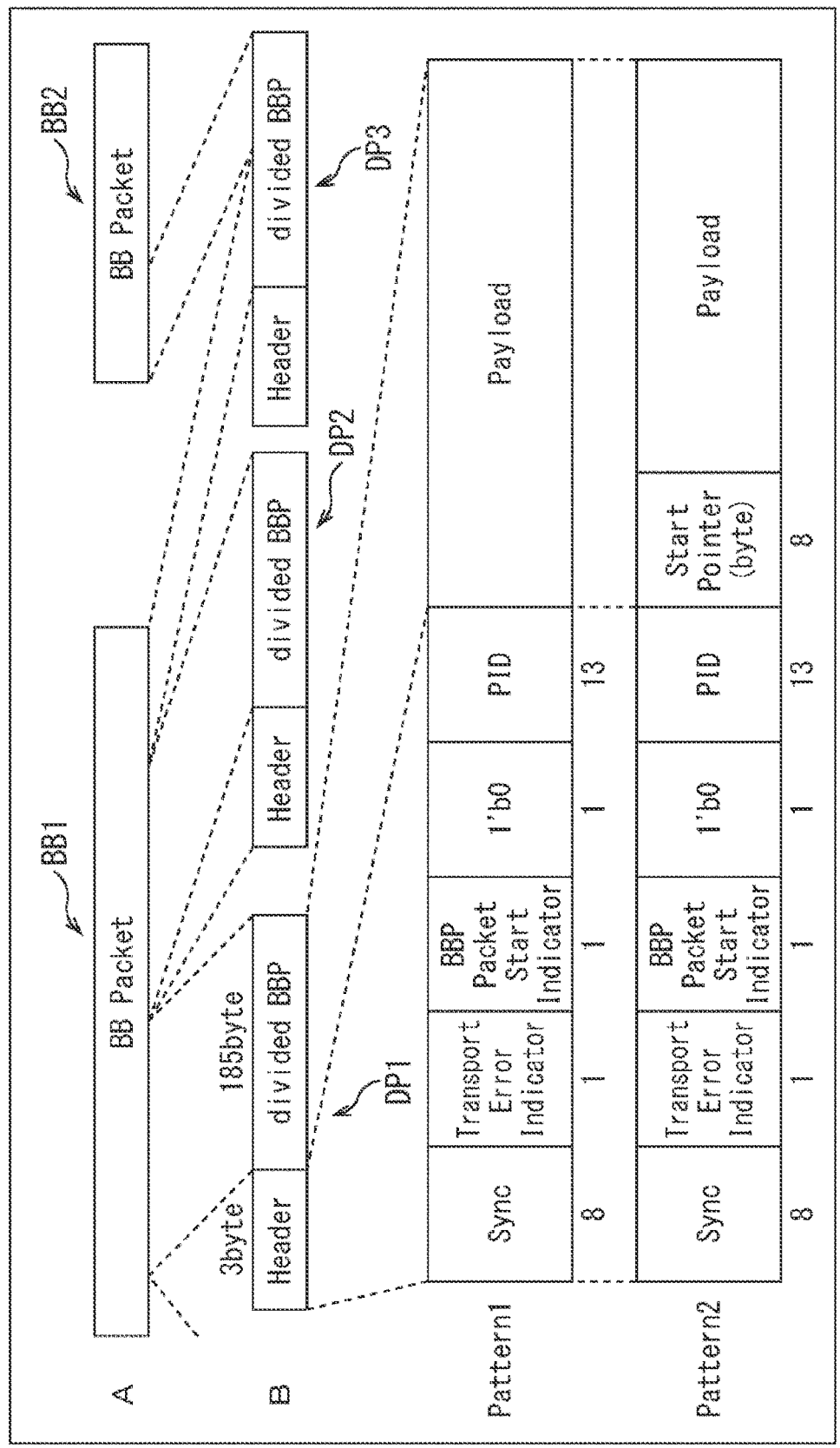
FIG. 16 is a diagram for describing a divided packet obtained by dividing a BB packet.

A case where the BB packet is divided into packets having the same configuration as the TS packet to output the BB packet will be described In the following description, the BB packet divided and output from the demodulation circuit 201 will be appropriately described as a divided packet. FIG. 16 is a diagram for describing a structure of a divided packet.

A divided packet obtained by dividing the variable-length BB packet according to the packet length (188 bytes) of the fixed-length TS packet, arranging the BB packet in a payload, and adding a header to the payload is output from the demodulation circuit 201 to the processing circuit 202 via the physical interface 203.

FIG. 16 illustrates a packet processed by the demodulation circuit 201. A of FIG. 16 illustrates a BB packet, and B of FIG. 16 illustrates a divided packet. In addition, as the divided header added to the divided packet, headers of two patterns of Pattern 1 and Pattern 2 are illustrated. Additional information is added to the BB packet illustrated in A of FIG. 16, and the additional information is also referred to as a BB packet.

In FIG. 16, two consecutive BB packets (BB1, BB2) among the plurality of BB packets sequentially processed in time series by the demodulation circuit 201 are illustrated, but part of the head BB packet BB1 is cut out and divided header is added, so that the divided packet DP1 is generated. Here, since the packet length of the TS packet is 188 bytes, a BB packet (divided BB) of 185 bytes is cut out so that the packet length of the divided packet DP1 is 188 bytes, that is, it is arranged in a payload of 185 bytes excluding a 3-byte divided header (Header) in accordance with the packet length of the TS packet.

The divided packet DP1 thus obtained includes a 3-byte divided header and a 185-byte payload, and has a packet length of 188 bytes. That is, here, divided packets in units of 188 bytes are sequentially generated by sequentially processing the BB packets. Specifically, the divided packet DP1 and the divided packet DP2 are generated by cutting out part of the BB packet BB1, and the divided packet DP3 is generated by cutting out part of the BB packet BB1 and part of the BB packet BB2.

Here, the divided header of the divided packet can have the structure illustrated in Pattern 1 or Pattern 2, for example. That is, 8-bit Sync, 1-bit Transport Error Indicator, 1-bit BB Packet Start Indicator, and 13-bit PID are arranged in the divided header of Pattern 1.

Sync is a synchronous byte, and is set to, for example, '0×47'. Transport Error Indicator is an error indicator, and is a fixed value of, for example, '1'b0'. In addition, Transport Error Indicator may be a flag indicating the presence or absence of a bit error in the divided packet. For example, in a case where Transport Error Indicator is '1', it indicates that an uncorrectable error of at least one bit exists in the divided packet.

BB Packet Start Indicator is a flag (BB packet head presence/absence flag) indicating the presence or absence of a pointer (hereinafter, referred to as a head pointer) indicating the position of the head of the BB packet arranged in the payload of the divided packet. For example, in a case where BB Packet Start Indicator is '0', it indicates that there is no head pointer.

That is, the divided header of Pattern 1 does not include the head pointer because the BB Packet Start Indicator is '0'. In the example of FIG. 16, since the payload of each of the divided packets DP1 and DP2 does not include the position of the head of the BB packet BB1, the BB Packet Start Indicator of '0' is arranged in the divided header, and the head pointer is not arranged.

Any fixed PID is assigned to PID.

In addition, the divided header of Pattern 2 is different from the divided header of Pattern 1 in that BB Packet Start Indicator is '1', indicating there is a head Pointer, and 8-byte Start Pointer is added.

Start Pointer is a head pointer indicating the position of the head of the BB packet arranged in the payload of the divided packet. In the example of FIG. 16, since the position of the head of the BB packet BB2 is included in the payload of the divided packet DP3, the BB Packet Start Indicator of '1' is arranged in the divided header, and the head pointer indicating the position of the head of the BB packet BB2 is arranged.

As illustrated in A of FIG. 10, in a case where the additional information is added before the BB packet like the header of the BB packet, the position of the head of the additional information is the position pointed by Start Pointer. In addition, as illustrated in B of FIG. 10, also in a case where part of the additional information is added before the BB packet like the header of the BB packet, the position of the head of the additional information is the position indicated by Start Pointer.

As described above, the divided header of the divided packet DP3 is Pattern 2, but the payload of each of the divided packets DP1 and DP2 does not include the position of the head of the BB packet, and thus the divided header of each of the divided packets DP1 and DP2 is Pattern 1. Note that, the size of the payload in the divided packet in the divided header of Pattern 2 is smaller than that in the divided header of Pattern 1 by the amount of arrangement of 8-byte Start Pointer.

The demodulation circuit 201 processes the BB packet to generate a divided packet to output the divided packet to the processing circuit 202 via the physical interface 203, so that the processing circuit 202 processes the divided packet from the demodulation circuit 201 to generate (restore) the BB packet.

At this time, the BB packet (divided BB) of 185 bytes cut out from the variable-length BB packet is arranged in the payload of the divided packet, and thus the BB packet can be restored from the divided packet by the processing circuit 202 by including the information (restoration information) for restoring the BB packet in the divided header.

The restoration information can include, for example, information corresponding to the TS header of the TS packet such as Transport Error Indicator. In addition, the information for restoring the BB packet can include a head pointer (Start Pointer) according to BB Packet Start Indicator.

That is, the BB packet arranged in the payload of the divided packet has a variable length, and when the BB packet is cut out on a 185 bytes basis in accordance with the fixed-length TS packet, the position of the head of the BB packet cannot be identified in the divided packet. Therefore, as illustrated in FIG. 16, by including the head pointer (Start Pointer) in the divided header of the divided packet, the processing circuit 202 can identify the position of the head of the BB packet in the divided packet and restore the BB packet.

Note that Pattern 1 and Pattern 2 described above are examples of the structure of the divided header, and can include other information. For example, in the divided header, information included in the TS header of the TS packet can be arranged instead of the next 1 bit ('1'b0') of BB Packet. Start Indicator or Transport Error indicator.

As described above, in the demodulation circuit 201, the variable-length BB packet divided according to the packet length (188 bytes) of the fixed-length TS packet, arranged in the payload, and then output to the processing circuit 202, so that the processing circuit 202 processes the fixed-length TS packet. Therefore, since the processing circuit 202 processes a packet whose packet length is known in advance, it is possible to reduce a processing load in the processing circuit 202 as compared with a case of handling a packet whose packet length is a variable length.

(Example of Configuration of Device)

In the above description, the description is made in which the demodulation circuit 201 as a demodulation IC and the processing circuit 202 as a system on chip (SoC) are incorporated in the reception device 20, but the demodulation circuit 201 and the processing circuit 202 may be configured as independent devices. That is, it can be said that the demodulation circuit 201 is a demodulation unit built in the reception device 20 or a demodulation device that performs processing by itself. In addition, it can be said that the processing circuit 202 is a processing unit built in the reception device 20 or a processing device that performs processing by itself.

(Example of Reception Device)

In the above description, the reception device 20 is described as a fixed receiver such as a television receiver, a set top box (STB), or the like, but may be, for example, a video recorder, a game machine, a network storage, or the like, or may be a mobile receiver such as a smartphone, a mobile phone, a tablet computer, or the like. In addition, for example, the reception device 20 may be a wearable computer such as a head mounted display (HMD), an in-vehicle device mounted on a vehicle such as an in-vehicle television, or the like.

(Example of Another Broadcasting System)

In the above description, ATSC (Specifically, ATSC 3.0) which is a system used in the United States and the like is described as a standard of digital broadcasting, but the present technology may be applied to integrated services digital broadcasting (ISDB), which is a system used in Japan and the like, digital video broadcasting (DVB), which is a system used in each country of Europe and the like, and the like. In addition, in the above description, the case where the existing system is the MPEG2 transport stream (TS) system and the new system is the IP transmission system is described, but a combination of other systems may be applied as the existing system and the new system.

In addition, as a standard of digital broadcasting, the present technology can be applied to standards of satellite broadcasting using a broadcasting satellite (BS), a communications satellite (CS), and the like, wired broadcasting such as cable television (CATV), and the like, in addition to terrestrial broadcasting.

(Application to System Other Than Broadcasting System)

In addition, the present technology can also be applied to predetermined standards (standards other than the digital broadcasting standards) and the like defined on the assumption that a transmission path other than the broadcast network, that is, for example, a communication line (communication network) such as the Internet or a telephone network, is used as the transmission path. In this case, a communication line such as the Internet or a telephone network is used as the transmission path 30 of the broadcasting system 1 (FIG. 5), and the transmission device 10 can be a server provided on the Internet. Then, the communication server and the reception device 20 perform bidirectional communication via the transmission path 30 (communication line).

(Another Example of Packet or Signaling)

In addition, the names of the above-described packet, frame, signaling (control information), and the like are merely examples, and other names may be used. However, the difference between these names is a formal difference, and substantial contents of a target packet, frame, signaling, and the like are not different.

For example, the BB packet or the ALP packet is an example of a transmission packet, and the transmission packet includes, for example, a type length value (TLV) packet or a generic stream encapsulation (GSE) packet which is a variable-length packet. Note that the frame and the packet may be used in the same meaning.

(Another Example of Time Information)

In the above description, the case where the time information defined by a precision time protocol (PTP) is used as the time information is described. However, the time information is not limited thereto, and, for example, any time information such as time information defined by a network time protocol (NTP) or a third generation partnership project (3GPP), time information included in a global positioning system (GPS) information, or time information in a format independently determined can be used.

In addition, in the above description, the description is made in which the time information indicates the time of the head of the physical layer frame, but the present invention is not limited thereto, and any time may be indicated. For example, the time information can represent the time (absolute time) at a predetermined position in the stream of the physical layer frame. That is, the time at the predetermined position in the stream is the time at the predetermined timing while the bit at the predetermined position is being processed by the transmission device 10. In addition, in a case where a structure in which a preamble is provided in a physical layer frame is used, time information may be included in the preamble.

<Configuration of Computer>

The above-described series of processing can be executed by hardware or software. In a case where the series of processing is executed by software, a program constituting the software is installed in a computer. FIG. 17 is a diagram illustrating a configuration example of hardware of a computer that executes the above-described series of processing by a program.

In a computer 1000, a central processing unit (CPU) 1001, a read only memory(ROM) 1002, and a random access memory (RAM) 1003 are mutually connected by a bus 1004. An input/output interface 1005 is further connected to the bus 1004. An input unit 1006, an output unit 1007, a recording unit 1008, a communication unit 1009, and a drive 1010 are connected to the input/output interface 1005.

The input unit 1006 includes a keyboard, a mouse, a microphone, and the like. The output unit 1007 includes a display, a speaker, and the like. The recording unit 1008 includes a hard disk, a nonvolatile memory, and the like. The communication unit 1009 includes a network interface and the like. The drive 1010 drives a removable medium 1011 such as a magnetic disk, an optical disk, a magneto-optical disk, or a semiconductor memory.

In the computer 1000 configured as described above, the CPU 1001 loads a program recorded in the ROM 1002 or the recording unit 1008 into the RAM 1003 via the input/output interface 1005 and the bus 1004 and executes the program, whereby the above-described series of processing is performed.

The program executed by the computer 1000 (CPU 1001) can be provided by being recorded in the removable medium 1011 as a package medium or the like, for example. In addition, the program can be provided via a wired or wireless transmission medium such as a local area network, the Internet, or digital satellite broadcasting.

In the computer 1000, the program can be installed in the recording unit 1008 via the input/output interface 1005 by attaching the removable medium 1011 to the drive 1010. In addition, the program can be received by the communication unit 1009 via a wired or wireless transmission medium and installed in the recording unit 1008. In addition, the program can be installed in the ROM 1002 or the recording unit 10018 in advance.

Here, in the present specification, the processing performed by the computer according to the program is not necessarily, performed in time series in the order described as the flowchart. That is, the processing performed by the computer according to the program also includes processing executed in parallel or individually (for example, parallel processing or processing by an object). In addition, the program may, be processed by one computer (processor) or may be processed in a distributed manner by a plurality of computers.

Note that the embodiments of the present technology are not limited to the above-described embodiments, and various modifications can be made without departing from the gist of the present technology.

In addition, the present technology can have the following configurations.

(1) An information processing apparatus including an output unit configured to add, to a baseband (BB) packet after an error correction decoding process, additional information related to the BB packet to output the BB packet.

(2) The information processing apparatus according to the item (1), in which the additional information includes at least one of a delimiter, a precision time protocol (PTP), or BB packet information.

(3) The information processing apparatus according to the item (2), in which the BB packet information includes at least one of information indicating whether or not reception of the BB packet is stable, information indicating whether or not there is an error in the BB packet, a packet length of the BB packet, a relative physical layer pipe (PLP) ID of the BB packet, or an absolute PLPID of the BB packet.

(4) The information processing apparatus according to the item (3), in which information about a packet length of the BB packet includes information about a code length and a coding rate of the BB packet.

(5) The information processing apparatus according to any one of the items (1) to (4), in which an ATSC link-layer protocol (ALP) packet is disposed in a payload of the BB packet.

(6) The information processing apparatus according to any one of the items (1) to (5), in which the additional information also includes a cyclic redundancy check (CRC) as error correction information for the additional information.

(7) The information processing apparatus according to any one of the items to (6), in which the additional information includes a flag indicating presence or absence of the delimiter, a flag indicating presence or absence of the PTP, and a flag indicating presence or absence of the BB packet information.

(8) The information processing apparatus according to any one of the items (1) to (7), in which the output unit outputs part of the additional information via a dedicated signal line.

(9) The information processing apparatus according to the item (5), in which the output unit is included in a demodulation circuit and is connected to a processing circuit that processes the BB packet from the demodulation circuit via a predetermined interface, and the processing circuit extracts and processes the ALP packet from the BB packet.

(10) The information processing apparatus according to any one of the items (1) to (9), in which the output unit divides the BB packet to which the additional information is added on a packet length basis, the packet length being associated with a transmission packet that includes a fixed-length packet used in a predetermined transmission system and arranges the BB packet in a payload, and outputs a divided packet obtained by adding, to the payload, a header including information for restoring the BB packet.

(11) The information processing apparatus according to the item (10), in which the predetermined transmission system includes an MPEG2 transport stream (TS) method, and the transmission packet includes a TS packet.

(12) An information processing method including an information processing apparatus adding, to a BB (baseband) packet after an error correction decoding process, additional information related to the BB packet and outputting the BB packet.

(13) A program for causing a computer to function as a processing unit configured to add, to a BB (baseband) packet after an error correction decoding process, additional information related to the BB packet to output the BB packet.

REFERENCE SIGNS LIST 1 broadcasting system
10 transmission device
20 reception device
30 transmission path
201 demodulation circuit
202 processing circuit
203 physical interface
211 demodulation unit
212 error correction unit
213 I/F unit
221 memory
222 de mux
223 memory
224 SW processing unit

The invention claimed is:

1. An information processing apparatus comprising:
a circuitry configured to:
receive a baseband (BB) packet after an error correction decoding process;
add additional information related to the BB packet to the BB packet; and
output the BB packet,
wherein the additional information includes at least one of a delimiter, a precision time protocol (PTP) or BB packet information, and
the additional information includes a flag indicating presence or absence of the delimiter, a flag indicating presence or absence of the PTP, and a flag indicating presence or absence of the BB packet information.

2. The information processing apparatus according to claim 1, wherein
the BB packet information includes at least one of information indicating whether or not reception of the BB packet is stable, information indicating whether or not there is an error in the BB packet, a packet length of the BB packet, a relative physical layer pipe (PLP) ID of the BB packet, or an absolute PLPID of the BB packet.

3. The information processing apparatus according to claim 2, wherein
information about the packet length of the BB packet includes information about a code length and a coding rate of the BB packet.

4. The information processing apparatus according to claim 1, wherein
an ATSC link-layer protocol (ALP) packet is arranged in a payload of the BB packet.

5. The information processing apparatus according to claim 4, wherein
the circuitry is included in a demodulation circuit and is connected to a processing circuit that processes the BB packet from the demodulation circuit via a predetermined interface, and
the processing circuit extracts and processes the ALP packet from the BB packet.

6. The information processing apparatus according to claim 1, wherein
the additional information also includes a cyclic redundancy check (CRC) as error correction information for the additional information.

7. The information processing apparatus according to claim 1, wherein
the circuitry is further configured to output a portion of the additional information via a dedicated signal line.

8. The information processing apparatus according to claim 1, wherein the circuitry is further configured to
divide the BB packet to which the additional information is added on a packet length basis, the packet length being associated with a transmission packet that includes a fixed-length packet used in a predetermined transmission system and arranges the BB packet in a payload, and
output a divided packet obtained by adding, to the payload, a header including information for restoring the BB packet.

9. The information processing apparatus according to claim 8, wherein
the predetermined transmission system includes an MPEG2 transport stream (TS) method, and the transmission packet includes a TS packet.

10. An information processing method comprising:
receiving, with circuitry of an information processing apparatus, a baseband (BB) packet after an error correction decoding process;
adding, with the circuitry, additional information to the BB packet, the additional information related to the BB packet and
outputting, with the circuitry, the BB packet including the additional information, wherein
the additional information includes at least one of a delimiter, a precision time protocol (PTP), or BB packet information, and
the additional information includes a flag indicating presence or absence of the delimiter, a flag indicating presence or absence of the PTP, and a flag indicating presence or absence of the BB packet information.

11. The information processing method according to claim 10, wherein
the BB packet information includes at least one of information indicating whether or not reception of the BB packet is stable, information indicating whether or not there is an error in the BB packet, a packet length of the BB packet, a relative physical layer pipe (PLP) ID of the BB packet, or an absolute PLPID of the BB packet.

12. The information processing method according to claim 11, wherein
information about the packet length of the BB packet includes information about a code length and a coding rate of the BB packet.

13. The information processing method according to claim 10, wherein
an ATSC link-layer protocol (ALP) packet is arranged in a payload of the BB packet.

14. The information processing method according to claim 13, wherein
the circuitry is included in a demodulation circuit and is connected to a processing circuit that processes the BB packet from the demodulation circuit via a predetermined interface, the method further comprising:

extracting, with the processing circuit, the ALP packet from the BB packet; and
processing, with the processing circuit, the ALP packet that is extracted.

15. The information processing method according to claim 10, wherein
the additional information also includes a cyclic redundancy check (CRC) as error correction information for the additional information.

16. The information processing method according to claim 10, wherein
a portion of the additional information is output via a dedicated signal line.

17. The information processing method according to claim 10, further comprising:
dividing, with the circuitry, the BB packet to which the additional information is added on a packet length basis, the packet length being associated with a transmission packet that includes a fixed-length packet used in a predetermined transmission system and arranges the BB packet in a payload;
generating, with the circuitry, a divided packet by adding a header including information for restoring the BB packet to the payload; and
outputting, with the circuitry, the divided packet.

18. A non-transitory computer-readable medium comprising a program that, when executed by a computer, causes the computer to perform a set of operations comprising:
receiving a baseband (BB) packet after an error correction decoding process;
adding additional information to the BB packet, the additional information related to the BB packet; and
outputting the BB packet including the additional information, wherein
the additional information includes at least one of a delimiter, a precision time protocol (PTP), or BB packet information, and
the additional information includes a flag indicating presence or absence of the delimiter, a flag indicating presence or absence of the PTP, and a flag indicating presence or absence of the BB packet information.

19. The non-transitory computer-readable medium according to claim 18, wherein
the BB packet information includes at least one of information indicating whether or not reception of the BB packet is stable, information indicating whether or not there is an error in the BB packet, a packet length of the BB packet, a relative physical layer pipe (PLP) ID of the BB packet, or an absolute PLPID of the BB packet.

20. The non-transitory computer-readable medium according to claim 19, wherein
information about the packet length of the BB packet includes information about a code length and a coding rate of the BB packet.

\* \* \* \* \*